(12) United States Patent
Verma et al.

(10) Patent No.: US 12,375,922 B2
(45) Date of Patent: *Jul. 29, 2025

(54) SELECTIVE INTELLIGENT ENFORCEMENT IN MOBILE NETWORKS

(71) Applicant: Palo Alto Networks, Inc., Santa Clara, CA (US)

(72) Inventors: Sachin Verma, Danville, CA (US); Leonid Burakovsky, Pleasanton, CA (US); John Edward McDowall, Redwood City, CA (US); Apoorva Jain, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/626,153

(22) Filed: Apr. 3, 2024

(65) Prior Publication Data

US 2025/0031044 A1    Jan. 23, 2025

Related U.S. Application Data

(63) Continuation of application No. 18/225,016, filed on Jul. 21, 2023, now Pat. No. 11,979,746.

(51) Int. Cl.
*H04W 12/088* (2021.01)
*H04L 9/40* (2022.01)

(52) U.S. Cl.
CPC ....... *H04W 12/088* (2021.01); *H04L 63/1425* (2013.01); *H04L 63/168* (2013.01); *H04L 63/205* (2013.01)

(58) Field of Classification Search
CPC ............ H04W 12/088; H04L 63/1425; H04L 63/168; H04L 63/205
See application file for complete search history.

(56) References Cited

U.S. PATENT DOCUMENTS

| 8,612,612 B1 | 12/2013 | Dukes |
| 10,374,871 B2 | 8/2019 | Ramachandran |

(Continued)

FOREIGN PATENT DOCUMENTS

| CN | 107959614 | 11/2020 | | |
| EP | 2933963 B1 * | 4/2018 | ......... | H04L 12/6418 |

(Continued)

OTHER PUBLICATIONS

Ivanov Konstantin, Containerization with LXC, Feb. 1, 2017.

(Continued)

*Primary Examiner* — Dinh Nguyen
(74) *Attorney, Agent, or Firm* — Van Pelt, Yi & James LLP

(57) ABSTRACT

Techniques for selective intelligent enforcement for mobile networks using a security platform are disclosed. In some embodiments, a system/process/computer program product for selective intelligent enforcement for mobile networks using a security platform includes monitoring network traffic in a core mobile network using a security platform executed on a network element in the core mobile network to identify a new session that attached to the core mobile network for mobile network communications; extracting meta information associated with the new session using the security platform executed on the network element in the core mobile network; applying selective intelligent enforcement using the security platform if the extracted meta information associated with the new session matches a selective intelligent enforcement policy; and offloading the session to bypass inspection by the security platform if the extracted meta information associated with the new session does not match the selective intelligent enforcement policy.

19 Claims, 16 Drawing Sheets

(56) References Cited

U.S. PATENT DOCUMENTS

| | | |
|---|---|---|
| 10,812,971 B2 | 10/2020 | Verma |
| 11,140,455 B1 | 10/2021 | Woodruff |
| 11,665,139 B2 | 5/2023 | McDowall |
| 11,689,502 B2 | 6/2023 | Burakovsky |
| 11,929,987 B1 | 3/2024 | D N |
| 11,950,144 B2 | 4/2024 | Verma |
| 11,979,746 B1 | 5/2024 | Verma |
| 12,244,647 B2 | 3/2025 | Verma |
| 2004/0193943 A1 | 9/2004 | Angelino |
| 2013/0070596 A1* | 3/2013 | Yeh .................. H04W 76/22 370/235 |
| 2014/0122435 A1 | 5/2014 | Chavda |
| 2016/0149863 A1 | 5/2016 | Walker |
| 2016/0269371 A1 | 9/2016 | Coimbatore |
| 2016/0342801 A1 | 11/2016 | Sreekanti |
| 2018/0063195 A1 | 3/2018 | Nimmagadda |
| 2019/0012162 A1 | 1/2019 | Vaikar |
| 2019/0053308 A1 | 2/2019 | Castellanos Zamora |
| 2019/0068641 A1 | 2/2019 | Araujo |
| 2019/0253389 A1 | 8/2019 | Verma |
| 2019/0394170 A1 | 12/2019 | Shameli-Sendi |
| 2020/0059992 A1 | 2/2020 | Skog |
| 2020/0128399 A1 | 4/2020 | Verma |
| 2020/0274852 A1 | 8/2020 | Ahmed |
| 2020/0396164 A1 | 12/2020 | Arimanda |
| 2020/0412755 A1 | 12/2020 | Jing |
| 2021/0271777 A1 | 9/2021 | Netsch |
| 2022/0224706 A1 | 7/2022 | Peng |
| 2023/0259614 A1 | 8/2023 | Gechman |
| 2023/0262076 A1 | 8/2023 | Gechman |
| 2024/0007494 A1 | 1/2024 | Mrozinski |
| 2024/0430680 A1 | 12/2024 | Rappard |

FOREIGN PATENT DOCUMENTS

| | | |
|---|---|---|
| WO | 2003025766 | 3/2003 |
| WO | 2020198157 | 10/2020 |

OTHER PUBLICATIONS

Nam et al., BASTION: A Security Enforcement Network Stack for Container Networks, USENIX, the Advanced Computing Systems Association, Feb. 3, 2021, pp. 1-24.
Author Unknown, Generic Flow API (rte_flow)—Data Plane Development Kit 21.05.0-rc1 documentation, downloaded Apr. 22, 2021.
ETSI, ETSI GS MEC 013 V3.1.1 (Jan. 2023), Group Specification, Multi-access Edge Computing (MEC); Location API.
ETSI, ETSI TS 129 571 V16.6.0 (Jan. 2021), Technical Specification, 5G; 5G System; Common Data Types for Service Based Interfaces; Stage 3, (3GPP TS 29.571 version 16.6.0 Release 16).
ETSI, ETSI TS 129 572 V16.6.0 (Apr. 2021), Technical Specification, 5G; 5G System; Location Management Services; Stage 3 (3GPP TS 29.572 version 16.6.0 Release 16).
Github, cni/SPEC.md at Master, containernetworking/cni, Container Network Interface (CNI) Specification, downloaded May 18, 2021.
Github, sessionOffload/GeneveOpenOffload.md at master—att/sessionOffload, downloaded Apr. 21, 2021.
Github, sessionOffload/openoffload. proto at v1beta1—att/sessionOffload, Apr. 30, 2021.
Gross et al., RFC 8926—Geneve: Generic Network Virtualization Encapsulation, Internet Engineering Task Force (IETF), Nov. 2020.
Istio, Istio Security, downloaded May 18, 2021.
Kubernetes, Network Plugins, downloaded May 18, 2021.
Mallu et al., Maintaining Transport Layer Security All the Way to Your Container: Using the Application Load Balancer with Amazon ECS and Envoy, May 29, 2020, pp. 1-22.
NVIDIA, NVIDIA Mellanox Bluefield-2, Data Processing Unit (DPU), Product Brief, Aug. 2020.
Palo Alto Networks, APP-ID, Technology Brief, pp. 1-5, downloaded Apr. 21, 2021.
Park et al., Core Container Security Frameworks, International Journal of Advanced Research in Engineering and Technology (IJARET), vol. 11, Issue 6, Jun. 2020, pp. 1024-1038.
Thaler et al., Making eBPF Work on Windows, Microsoft Open Source Blog, (https://cloudblogs.microsoft.com/opensource/), May 10, 2021.
Wikipedia, Bump-in-the-Wire, page last edited Sep. 7, 2020.
3GPP, 3GPP TR 33.811 V15.0.0 (Jun. 2018), 3rd Generation Partnership Project; Technical Specification Group Services and System Aspects; Study on security aspects of 5G network slicing management, (Release 15), 19 pages.
3GPP, 3GPP TS 23.503 V18.2.0 (Jun. 2023), 3rd Generation Partnership Project; Technical Specification Group Services and System Aspects; Policy and charging control framework for the 5G System (5GS); Stage 2, (Release 18), 182 pages.
Author Unknown, N4 Interface Configuration, Feb. 2020, pp. 1-4.
ETSI, ETSI GS MEC 013 V3.1.1 (Jan. 2023), Technical Specification, Multi-access Edge Computing (MEC); Location API, 85 pages.
ETSI, ETSI TS 129 244 V16.5.0 (Nov. 2020), Technical Specification, LTE; 5G; Interface between the Control Plane and the User Plane nodes (3GPP TS 29.244 version 16.5.0 Release 16), 317 pages.
ETSI, ETSI TS 129 281 V15.4.0 (Sep. 2018), Technical Specification, Universal Mobile Telecommunications System (UMTS); Lte; General Packet Radio System (GPRS), Tunnelling Protocol User Plane (GTPv1-U), (3GPP TS 29.281 version 15.4.0 Release 15), 34 pages.
ETSI, ETSI TS 129 571 V16.6.0 (Jan. 2021), Technical Specification, 5G; 5G System; Common Data Types for Service Based Interfaces; Stage 3 (3GPP TS 29.571 version 16.6.0 Release 16), 131 pages.
ETSI, ETSI TS 129 572 V16.6.0 (Apr. 2021), Technical Specification, 5G; 5G System; Location Management Services; Stage 3 (3GPP TS 29.572 version 16.6.0 Release 16), 94 pages.
Intel, Intel® FPGA SmartNIC N6000-PL Platform, Jun. 19, 2025, 3 pages.
Liia Sarjakoski, The Four 5G Edge Environments and How to Secure Them, Dec. 16, 2021, 5 pages.
Najjar et al., WIA Innovation & Technology Council, The 5G Paradox, The Need for More Offloading Options in the Next-Generation Wireless Era, Feb. 8, 2019, 19 pages.
NVIDIA, Bluefield-3 DPU, Programmable Data Center Infrastructure On-A-Chip, 2021, 2 pages.
Sabina Anja, VMware Cloud Foundation (VCE) Blog, Feb. 20, 2023, pp. 1-6.
Teppo et al., Security in 5G RAN and core deployments, Jun. 19, 2025, pp. 1-10.

* cited by examiner

SELECTIVE INTELLIGENT ENFORCEMENT IN MOBILE NETWORKS

CROSS REFERENCE TO OTHER APPLICATIONS

This application is a continuation of U.S. patent application Ser. No. 18/225,016 entitled SELECTIVE INTELLIGENT ENFORCEMENT IN MOBILE NETWORKS, filed Jul. 21, 2023, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
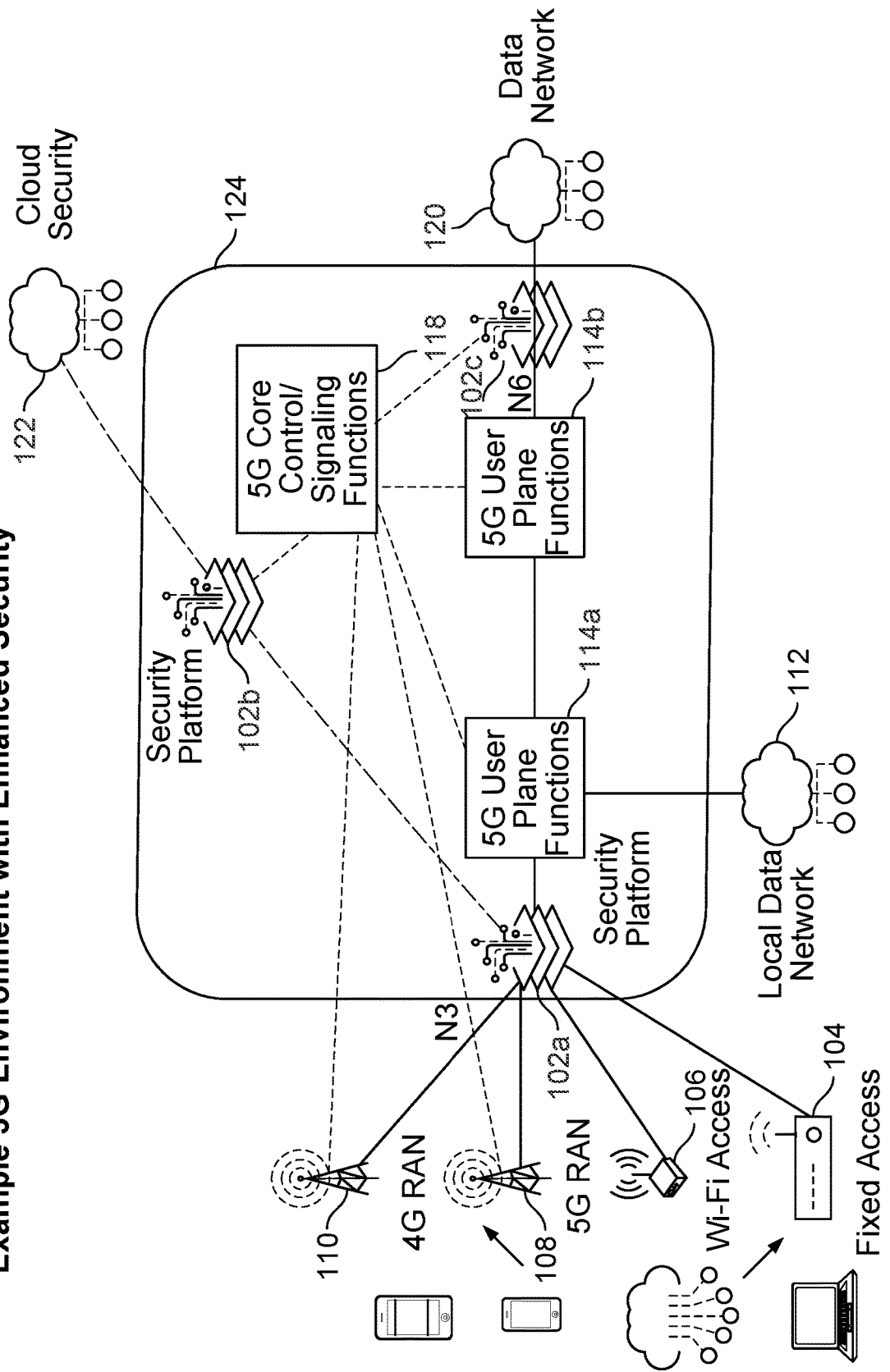
FIG. 1 is a block diagram of an architecture of a 5G wireless network environment with enhanced security in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QOS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

For example, Palo Alto Networks' next generation firewalls enable enterprises and service providers to identify and control applications, users, and content—not just ports, IP addresses, and packets-using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for Selective Intelligent Enforcement for Mobile Networks and Selective Intelligent Offloading for Mobile Networks For security as a service use case, service providers (e.g., mobile network service providers) generally desire a security solution that can effectively and efficiently apply L7 inspection to selected users (e.g., selected subscribers of their mobile network) who have also, for example, subscribed to security services from the service provider and allow the rest of the traffic to pass through their mobile network without applying (additional) security. Also, some regulatory use cases require service providers to have security capabilities per subscriber or per equipment level. For example, there is a need to facilitate a security solution that can monitor and block threat activity of a selected subset of the mobile network subscribers. Moreover, due to the ever increasing network traffic passing through such mobile networks, such service providers of these mobile networks generally need network security to be more cost effective and to inspect traffic selectively for efficiency.

As such, what are needed are new and improved security techniques for devices communicating on such service provider mobile network environments (e.g., mobile networks, including various 4G/LTE, 5G (and later) mobile networks). Specifically, what are needed are new and improved solutions for effective and efficient security enforcement for these mobile network environments.

Accordingly, various techniques for providing effective and efficient security enforcement for these mobile network environments (e.g., mobile networks, including various 4G/LTE, 5G (and later) mobile networks) are disclosed.

Techniques for selective intelligent enforcement for mobile networks using a security platform are disclosed. In some embodiments, a system/process/computer program product for selective intelligent enforcement for mobile networks using a security platform includes monitoring network traffic in a core mobile network using a security platform executed on a network element in the core mobile network to identify a new session that attached to the core mobile network for mobile network communications; extracting meta information associated with the new session using the security platform executed on the network element in the core mobile network; applying selective intelligent enforcement using the security platform if the extracted meta information associated with the new session matches a selective intelligent enforcement policy; and offloading the session to bypass inspection by the security platform if the extracted meta information associated with the new session does not match the selective intelligent enforcement policy.

Also, techniques for selective intelligent offloading for mobile networks using a security platform are disclosed. In some embodiments, a system/process/computer program product for selective intelligent offloading for mobile networks using a security platform includes monitoring network traffic in a core mobile network using a security platform executed on a network element in the core mobile network to identify a new session that attached to the core mobile network for mobile network communications; extracting meta information associated with the new session using the security platform executed on the network element in the core mobile network; applying selective intelligent offloading using the security platform if the extracted meta information associated with the new session matches a selective intelligent offload policy; and performing traffic inspection by the security platform if the extracted meta information associated with the new session does not match a selective intelligent offload policy.

In addition, techniques for selective intelligent enforcement and/or selective intelligent offloading for mobile networks using a smart network interface card are disclosed. In some embodiments, a system/process/computer program product for selective intelligent enforcement and/or selective intelligent offloading for mobile networks using a smart network interface card includes monitoring network traffic in a core mobile network using a security platform executed on a network element in the core mobile network to identify a new session that attached to the core mobile network for mobile network communications; extracting meta information associated with the new session using the security platform executed on the network element in the core mobile network; applying selective intelligent enforcement using the security platform if the extracted meta information associated with the new session matches a selective intelligent enforcement policy; and offloading the session to bypass inspection by the security platform if the extracted meta information associated with the new session does not match the selective intelligent enforcement policy.

In some embodiments, the disclosed techniques for selective intelligent enforcement and/or selective intelligent offloading for mobile networks can be implemented in one or more of the following three different locations: (1) offloading the traffic in a software implemented firewall; (2) offloading the traffic for further security analysis using a network interface card (NIC) (e.g., a DPU); and/or (3) offloading the traffic to another network device. For example, as further described below, the disclosed techniques can be performed using a network interface element that includes the following: (1) a Network Interface Card (NIC); (2) a SmartNIC; (3) a Data Processing Unit (DPU); (4) an Infrastructure Processing Unit (IPU); and/or (5) a SmartFabric.

These and other embodiments and examples for selective intelligent enforcement for mobile networks and selective intelligent offloading for mobile networks using a security platform in service provider mobile networks or other mobile networks will be further described below.

Example Mobile Network Environment with Security Platforms

Accordingly, in some embodiments, the disclosed techniques include providing a security platform that includes a Data Processing Unit (DPU), such as further described below (e.g., the security function(s)/platform(s) can be implemented using a firewall (FW)/Next Generation Firewall (NGFW), a network sensor acting on behalf of the firewall, or another (virtual) device/component that can implement security policies (e.g., zero trust security policies), such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of network traffic by providing effective and efficient security enforcement for these mobile network environments as further described below.

Generally, 5G is the 5th generation of the mobile communications system. The 3rd Generation Partnership Project (3GPP) (e.g., 3GPP includes seven telecommunications standard development organizations (ARIB, ATIS, CCSA, ETSI, TSDSI, TTA, TTC) and the project covers cellular telecommunications network technologies, including radio access, the core transport network, and service capabilities and the specifications also provide hooks for non-radio access to the core network, and for interworking with Wi-Fi networks) and other organizations including ITU, IETF, and ETSI are developing 5G standards. Some of the improvements of the new 5G network standards include, for example, low latency (e.g., approximate less than 10 milliseconds (MS)), high throughput (e.g., multi-Gbps), distribution, network function virtualization infrastructure, as well as orchestration, analytics, and automation.

The 5G architecture is defined in 3GPP TS 23.501 v15.3.0 available at https://portal.3gpp.org/desktopmodules/Specifications/SpecificationDetails.aspx?specificationId=3144 as service-based and the interaction between network functions (NFs) is represented in two ways: (1) service-based representation, where NFs within the Control Plane (CP) enable other authorized network functions to access their services; and (2) reference point representation that focuses on the interactions between pairs of NFs defined by a point-to-point reference point between any two network functions.

In the 5G architecture, the User Plane Protocol stack between access network and core over backbone network over N3 interface will be based on GPRS Tunnel Protocol User Plane (GTP-U). The Control Plane NFs in the 5G system architecture shall be based on the service-based architecture. HTTP/2 will be the protocol used over service-based interfaces. A new 5G Access Network protocol will be based over Stream Control Transmission Protocol (SCTP).

Accordingly, in some embodiments, the disclosed techniques include providing a security platform (e.g., PANOS executing on an NGFW available from Palo Alto Networks, Inc. or another security platform/NFGW) configured to provide DPI capabilities (e.g., including stateful inspection) of, for example, GTP-U sessions and new HTTP/2 based TCP sessions that facilitate a correlation between monitored GTP-U tunnel sessions and new HTTP/2 based TCP sessions as further described below.

In some embodiments, a security platform (e.g., PANOS executing on an NGFW available from Palo Alto Networks, Inc. or another security platform/NFGW) is configured to provide the following DPI capabilities: stateful inspection of N3 GTP-U tunnels; content inspection of N3 GTP-U tunnels (e.g., to inspect content of inner IP sessions of N3 GTP-U tunnels); support for 3GPP Technical Specification (TS) 29 274 V15.3.0 Release 15 (e.g., and later releases) for procedures for the 5G system to support 5G cellular technology; and support for 3GPP Technical Specification (TS) 29.281 V15.4.0 Release 14 (e.g., and later releases) for GTP-U protocol.

FIG. 1 is a block diagram of an architecture of a 5G wireless network environment with enhanced security in accordance with some embodiments. Specifically, FIG. 1 is an example 5G mobile network environment that includes a Security Platform at various locations as shown at 102a, 102b, and 102c (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for providing enhanced security (e.g., over various interfaces, such as SGi and/or other interfaces in a 4G/LTE core network, and N3 interface (e.g., protected by Security Platform 102a as shown in FIG. 1) and/or N6 interface (e.g., protected by Security Platform 102c as shown in FIG. 1) and/or other interfaces in a 5G core network as shown in FIG. 1) in mobile networks (e.g., 4G/LTE, 5G, and/or later mobile networks) as further described below.

As shown, the 5G network can also include Fixed/Wired access as shown at 104, Non-3GPP access, such as Wi-Fi Access as shown at 106, 5G Radio Access Network (RAN) access as shown at 108, 4G RAN access as shown at 110, and/or other networks (not shown in FIG. 1) to facilitate data communications for subscribers (e.g., using User Equipment (UE), such as smart phones, laptops, computers (which may be in a fixed location), and/or other cellular enabled computing devices/equipment, such as Industrial Internet of Things (IIoT)/Consumer Internet of Things (CIoT) devices, or other network communication enabled devices) including over a Local Data Network (e.g., enterprise network) 112 and a Data Network (e.g., the Internet) 120 to access various applications, web services, content hosts, etc. and/or other networks. As shown in FIG. 1, each of the 5G network access mechanisms 104, 106, 108, and 110 are in communication with 5G User Plane Functions 114a, which pass through Security Platform 102a, and 5G User Plane Functions 114a are in communication with 5G User Plane Functions 114b. As shown, 4G RAN 110 and 5G RAN 108 are in communication with 5G Core Control/Signaling Functions 118, which is in communication with 5G User Plane Functions 114b.

Referring to FIG. 1, network traffic communications are monitored using Security Platforms 102a, 102b, and 102c, which are located within core 5G mobile network 124 in this example environment (e.g., one or more security platforms can be provided in various locations within the core 5G mobile network and/or between the 4G/5G RAN and various other Wi-Fi/Fixed access points and the core 5G mobile network, and/or between the core 5G mobile network and the data network(s)/Internet, such as further described below with respect to various embodiments). For example, Security Platform 102a can also be in communication with security platforms 102b and/or 102c to facilitate the disclosed techniques, such as for providing a correlation between monitored GTP-U tunnel sessions and new HTTP/2 based TCP sessions as further described below. As shown, network traffic communications are monitored/filtered in the 5G network using Security Platforms 102a, 102b, and 102c (e.g., (virtual) devices/appliances that each include a firewall (FW), a network sensor acting on behalf of the firewall, or another device/component that can implement security policies using the disclosed techniques as will be further described below with respect to various embodiments) configured to perform the disclosed security techniques as further described below.

In this example implementation, the disclosed security platforms are configured to provide the following DPI capabilities: DPI of IP traffic over the N3 interface (e.g., and/or other interfaces in core mobile networks, such as the N4, N6 interface, etc.). In an example implementation, the security platform is configured to provide DPI capabilities (e.g., including to identify an APP ID, a user ID (e.g., subscriber identity) such as based on extracting an International Mobile Subscription Identifier (IMSI) or Subscription Permanent Identifier (SUPI), a device ID (e.g., equipment identity) such as based on extracting an International Mobile Equipment Identifier (IMEI) or Permanent Equipment Identifier (PEI), a content ID, perform URL filtering, etc.) of, for example, IP sessions over N6 interfaces between user plane functions (UPFs) 114a/b and Public Service Network/Internet 120 to apply security on monitored user plane traffic based on a policy (e.g., enhanced security including, for example, layer-7 security, and/or various other fine grained and/or zero trust security policy enforcement) as further described below. For example, the disclosed security platforms 102a, 102b, and 102c can be implemented to monitor UE sessions in 5G core mobile network 124 including over various protocols (e.g., HTTP/2, PFCP and GTP) and various interfaces (e.g., N3 interface as shown in FIG. 1, as well as other interfaces, such as the N4, N6, and/or other interfaces in the core mobile network) to enforce a configured security policy at security platform 102a, 102b, and/or 102c (e.g., based on stateful correlation between traffic on various interfaces and NFs, such as to extract various parameters and/or payloads associated with the monitored network traffic/user session traffic to identify malware, malicious URLs/domain names, and/or exploit attempts), such as will be further described below.

In addition, Security Platforms 102a, 102b, and/or 102c can also be in network communication with a Cloud Security 122 (e.g., a cloud security service, such as a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, the Cloud Security service can be utilized to provide the Security Platforms with dynamic prevention signatures for malware, DNS, URLs, CNC malware, and/or other malware as well as to receive malware samples for further security analysis. As will now be apparent, network traffic communications can be monitored/filtered using one or more security platforms for network traffic communications in various locations within the 5G network to facilitate enhanced security for 4G, 5G, and later versions of these mobile network environments, as will now be further described with respect to various embodiments.

Overview of Techniques for Providing Selective Intelligent Enforcement for Mobile Networks Using a Security Platform Various techniques for providing selective intelligent enforcement for mobile networks using a security platform will now be described with respect to various embodiments.

In one embodiment, techniques for applying selective intelligent enforcement per network slice in mobile networks are described below with respect to various embodiments.

In one embodiment, techniques for applying selective intelligent enforcement per subscriber identity and/or equipment identity in mobile networks are described below with respect to various embodiments.

In one embodiment, techniques for applying selective intelligent enforcement per access point name/data network name (APN/DNN) in mobile networks are described below with respect to various embodiments.

In one embodiment, techniques for applying selective intelligent enforcement per location in mobile networks are described below with respect to various embodiments.

In one embodiment, techniques for applying selective intelligent enforcement per Radio Access Technology (RAT) type in mobile networks are described below with respect to various embodiments.

In some embodiments, techniques for applying selective intelligent enforcement per network slice, per subscriber identity and/or equipment identity, per APN/DNN, per location, and/or per RAT type in mobile networks are described below with respect to various embodiments.

These and other techniques for providing selective intelligent enforcement for mobile networks using a security platform will now be further described below with respect to various embodiments.

Example Embodiments for Selective Intelligent Enforcement for Mobile Networks Using a Security Platform Selective Intelligent Enforcement for Mobile Networks Per Network Slice Using a Security Platform Generally, there is a need to provide for selective intelligent enforcement per network slice in mobile networks. Specifically, mobile network service providers (e.g., such as AT&T Wireless, Verizon Wireless, etc.) generally desire the capability to apply network security to selective enterprise customers subscribed to a security service (e.g., a commercially available security service, such as provided by Palo Alto Networks, Inc., headquartered in Santa Clara, CA, and/or another security service provider) and offload the remaining traffic to improve security analysis performance. In addition, mobile network service providers also generally desire the capability to apply network security to selected industry verticals, such as critical infrastructure, manufacturing, mining, government, etc., which are subscribed to a security service and offload the remaining traffic to improve security analysis performance. Mobile network service providers also generally desire the capability to apply network security to only Internet of Things (IoT) (e.g., CIoT) and/or Operational Technology (OT) (e.g., CIoT) customers in 5G and later networks and offload the remaining traffic to improve security analysis performance.

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Accordingly, various techniques for providing selective intelligent enforcement based on network slice information (S-NSSAI) for mobile networks using a security platform are disclosed as will now be described with respect to FIG. 2A.

Figure 2A:
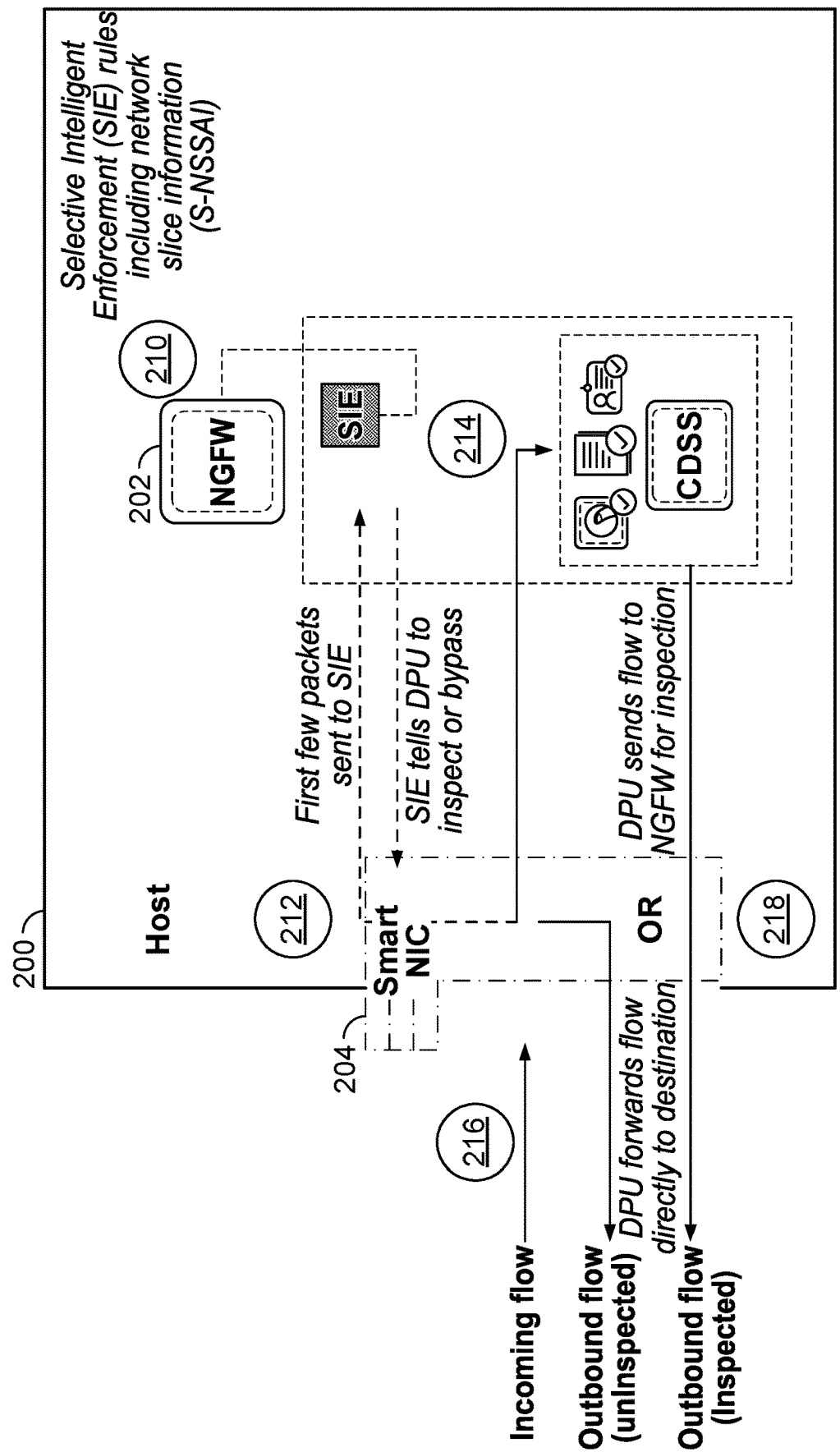
FIG. 2A illustrates selective intelligent enforcement based on network slice information (S-NSSAI) for mobile networks using a security platform in accordance with some embodiments.

FIG. 2A illustrates selective intelligent enforcement based on network slice information (S-NSSAI) for mobile networks using a security platform in accordance with some embodiments. Referring to FIG. 2A, a security platform includes a network gateway firewall (NGFW) entity 202 (e.g., a virtual/container implemented firewall solution, such as similarly described above) that is executed on a host 200 that also includes a Smart NIC 204.

In an example implementation, the security platform is configured with an intelligent traffic offload service as further described herein, and the security platform eliminates the tradeoff between network performance and enhanced security protection provided by selective traffic inspection/offloading. Specifically, the disclosed intelligent traffic offload service integrates with commercially available Smart Network Interface Cards (NICs) (e.g., NVIDIA BlueField-3 DPU and/or other commercially available Smart NICs with DPU capabilities) to significantly improve the security platform performance in mobile network environments. For example, for each new flow on the network, the disclosed intelligent traffic offload service can determine whether the flow can benefit from security inspection or not. The determination can be performed based on a policy or based on the flow's inability to be inspected (e.g., certain encrypted traffic). If the flow is determined to bypass security inspection/analysis, then the flow is offloaded to the Smart NIC saving the need for the firewall (e.g., NFGW 202) to analyze it, leading to a reduction in load on the firewall and thereby can significantly improve performance for security analysis in mobile network environments.

In an example implementation, the disclosed techniques for providing an intelligent traffic offload service that effectively and efficiently integrates with commercially available Smart NICs (e.g., NVIDIA BlueField-3 DPU and/or other commercially available Smart NICs with DPU capabilities) to significantly improve the security platform performance in mobile network environments is further described in U.S. Pat. No. 11,665,139 entitled DISTRIBUTED OFFLOAD LEVERAGING DIFFERENT OFFLOAD DEVICES filed Apr. 30, 2021, issued May 30, 2023, which is incorporated herein by reference for all purposes.

Specifically, the disclosed techniques for selective intelligent enforcement based on network slice information (S-NSSAI) for mobile networks using a security platform include applying selective intelligent enforcement (SIE) to network traffic of interest by a security platform (e.g., NFGW 202 using Smart NIC 204 of host 200) and offloading the remainder of the traffic (e.g., non-selected flows). The security platform can be deployed in 5G/other mobile networks (e.g., such as shown in FIG. 1) and intelligent enforcement can be based on network slice (S-NSSAI) information extracted from monitored network traffic/flows (e.g., based on a policy for SIE based on S-NSSAI configured for the security platform). The S-NSSAI includes two attributes: the SST (Slice/Service Type) and an optional SD (Slice Differentiator).

More specifically, the disclosed techniques for selective intelligent enforcement based on network slice information (S-NSSAI) for mobile networks using a security platform can be performed using two different techniques as will each now be described below.

As a first technique for selective intelligent enforcement based on network slice information (S-NSSAI) for mobile networks using a security platform, the security platform receives a first number of packets for inspection (e.g., a first few packets for a new flow) as shown at 212 for an incoming flow 216. The security platform checks if an IP address(es) associated with the packets match a network slice configured in a policy (e.g., selective intelligent enforcement (SIE) policy rules configured in the policy/security policy) as shown at 210. For an IP to network slice match, the security platform refers to its S-NSSAI to IP data store (e.g., implemented as a database, such as an SQL database, or another type of data store) maintained by NGFW 202. In this example implementation, the S-NSSAI to IP mappings can be collected by the security platform using various techniques including inspection of Packet Forwarding Control Protocol (PFCP) messages, APIs, syslog messages, etc. If the S-NSSAI to IP mappings match a selective intelligent enforcement (SIE) policy rule, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 214. If there is no match, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 218.

As such, in this example implementation, the security platform only has to maintain the session table of flows including IPs mapped to network slices configured in the selective intelligent enforcement (SIE) policy. In this example implementation, the security platform maintains the Network Slice to the IP mapping data store of all the User Equipment devices (UEs) whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent enforcement policy, configured in the security platform. A second session table is maintained for the offloaded flows.

As a second technique for selective intelligent enforcement based on network slice information (S-NSSAI) for mobile networks using a security platform, the security platform receives a first number of packets for inspection (e.g., a first few packets for a new flow). The security platform checks if an IP address(es) associated with the packets match a network slice configured in a policy (e.g., selective intelligent enforcement (SIE) policy rules configured in the policy/security policy). For an IP to network slice match, the security platform refers to an S-NSSAI to IP data store (e.g., implemented as a database, such as an SQL database, or another type of data store) maintained by Smart NIC 204 (e.g., implemented using a Smart NIC, DPU, UPF, or similar device). In this example implementation, the S-NSSAI to IP mappings can be collected by Smart NIC 204 using various techniques including inspection of PFCP messages, APIs, syslog messages, etc. If the S-NSSAI to IP mappings match a selective intelligent enforcement (SIE) policy rule, then the security platform initiates/sets up a session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security). If there is no match, then the security platform will instruct the Smart NIC (e.g., Smart NIC 204 implemented using a Smart NIC, DPU, UPF, or similar device) or similar device to offload this session (i.e., bypass security inspection).

As such, in this example implementation, the security platform only has to maintain the session table of flows including IPs mapped to network slices configured in the selective intelligent enforcement (SIE) policy. In this example implementation, in contrast to the above-described first technique, the Smart NIC 204 (e.g., implemented using a Smart NIC, DPU, UPF, or similar device) maintains the Network Slice to the IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent enforcement policy, configured in the security platform. A second session table is maintained for the offloaded flows.

As an example, the disclosed techniques for selective intelligent enforcement for mobile networks per network slice using a security platform can be performed to selectively apply application control to network traffic of a network slice and offload the rest of the traffic in the mobile network (e.g., 5G network).

As another example, the disclosed techniques for selective intelligent enforcement for mobile networks per network slice using a security platform can be performed to selectively apply URL filtering to network traffic of a network slice and offload the rest of the traffic in the mobile network (e.g., 5G network).

As yet another example, the disclosed techniques for selective intelligent enforcement for mobile networks per network slice using a security platform can be performed to selectively apply known and unknown threat identification and prevention to network traffic of a network slice and offload the rest of the traffic in the mobile network (e.g., 5G network).

As a further example, the disclosed techniques for selective intelligent enforcement for mobile networks per network slice using a security platform can be performed to deliver selective intelligent enforcement solutions (e.g., including a security platform and devices/hosts including DPUs, Smart NICs, UPFs, etc.) in the mobile network (e.g., 5G network).

Example Use Cases for Selective Intelligent Enforcement Per Network Slice Using a Security Platform for Mobile Networks As a first example use case, mobile network service providers typically cannot differentiate for many reasons (e.g., legal, privacy, and/or other reasons) between traffic of different 5G enterprise customers to apply security. As such, for security as a service use case, mobile network service providers have a need for a security platform to inspect traffic and apply L7 security to selected 5G enterprise customers only and offload the rest of the data traffic.

As a second example use case, 5G (and later versions) mobile networks will generally increase the network traffic with higher throughput, and an increasing number of UEs including IoT devices will generally connect for service to such service provider mobile networks. As such, mobile network service providers have a need for a security platform solution that can reduce the cost of a security solution with optimal usage of processor (e.g., CPU), storage (e.g., memory), and/or other resources of security platforms.

As a third example use case, mobile network service providers desire a security solution that can selectively inspect network traffic of several groups of IoT/OT customers to apply L7 security and offload traffic with no security value or revenue attached (e.g., not associated with an additional security subscription to provide enhanced security for such traffic).

As will now be apparent to one of ordinary skill in the art, the disclosed techniques for selective intelligent enforcement per network slice for mobile networks using a security platform can be applied in a variety of additional example use case scenarios to detect/prevent these and other types of attacks for facilitating enhanced security for various deployments and environments in mobile networks.

Selective Intelligent Enforcement for Mobile Networks Per Subscriber Identity and/or Equipment Identity Using a Security Platform Generally, there is a need to provide for selective intelligent enforcement per subscriber identity and/or equipment identity in mobile networks. Specifically, mobile network service providers (e.g., such as AT&T Wireless, Verizon Wireless, etc.) generally desire the capability to apply network security to selective enterprise customers subscribed to a security service (e.g., a commercially available security service, such as provided by Palo Alto Networks, Inc., headquartered in Santa Clara, CA, and/or another security service provider) and offload the remaining traffic to improve security analysis performance. In addition, some regulatory use cases may require that mobile network service providers provide security capabilities at a per subscriber level and/or at a per equipment level (e.g., to be able to monitor and block threat activity of a selected subset of subscribers).

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Accordingly, various techniques for providing selective intelligent enforcement per subscriber identity and/or per equipment identity for mobile networks using a security platform are disclosed as will now be described with respect to FIG. 2B.

Figure 2B:
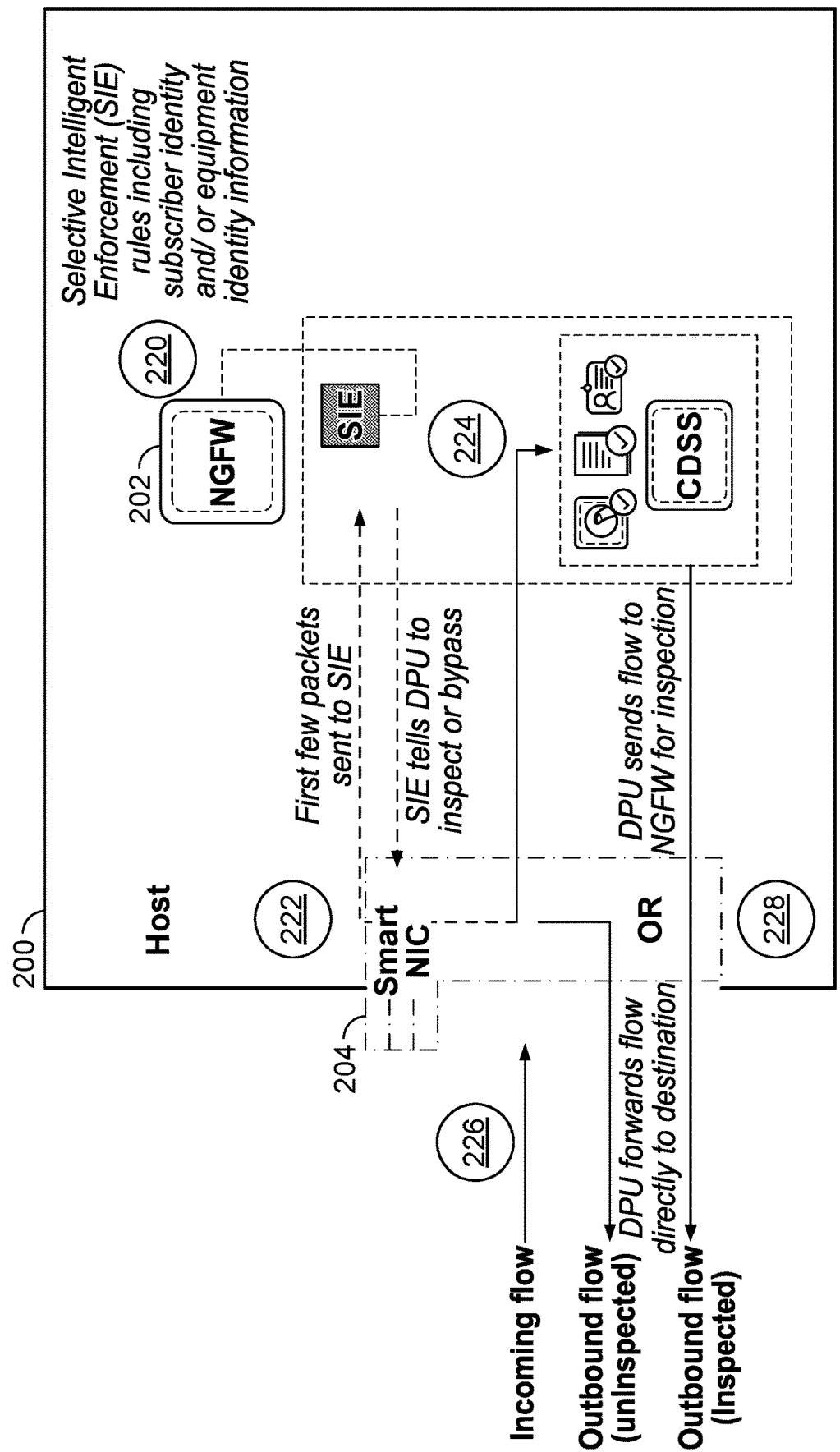
FIG. 2B illustrates selective intelligent enforcement per subscriber identity and/or per equipment identity for mobile networks using a security platform in accordance with some embodiments.

FIG. 2B illustrates selective intelligent enforcement per subscriber identity and/or per equipment identity for mobile networks using a security platform in accordance with some embodiments. Referring to FIG. 2B, a security platform includes a network gateway firewall (NGFW) entity 202 (e.g., a virtual/container implemented firewall solution, such as similarly described above) that is executed on a host 200 that also includes a Smart NIC 204. In an example implementation, the security platform is configured with an intelligent traffic offload service as similarly described above with respect to FIG. 2A.

Specifically, the disclosed techniques for selective intelligent enforcement per subscriber identity (e.g., IMSI and/or SUPI) and/or per equipment identity (e.g., IMEI and/or PEI) for mobile networks using a security platform include applying selective intelligent enforcement (SIE) to network traffic of interest by a security platform (e.g., NFGW 202 using Smart NIC 204 of host 200) and offload the remainder of the traffic (e.g., non-selected flows). The security platform can be deployed in 5G/other mobile networks (e.g., such as shown in FIG. 1) and intelligent enforcement can be per subscriber identity (e.g., IMSI and/or SUPI) and/or per equipment identity (e.g., IMEI and/or PEI) information extracted from monitored network traffic/flows (e.g., based on a policy for SIE based on subscriber identity (e.g., IMSI and/or SUPI) and/or equipment identity (e.g., IMEI and/or PEI) configured for the security platform).

More specifically, the disclosed techniques for selective intelligent enforcement per subscriber identity (e.g., IMSI and/or SUPI) and/or per equipment identity (e.g., IMEI and/or PEI) for mobile networks using a security platform can be performed using two different techniques as will each now be described below.

As a first technique for selective intelligent enforcement per subscriber identity (e.g., IMSI and/or SUPI) and/or per equipment identity (e.g., IMEI and/or PEI) for mobile networks using a security platform, the security platform receives a first number of packets for inspection (e.g., a first few packets for a new flow) as shown at 222 for an incoming flow 226. The security platform checks if an IP address(es) associated with the packets match a subscriber identity (e.g., IMSI and/or SUPI) and/or an equipment identity (e.g., IMEI and/or PEI) configured in a policy (e.g., selective intelligent enforcement (SIE) policy rules configured in the policy/security policy) as shown at 220. For an IMSI/SUPI to IP and/or IMEI/PEI to IP match, the security platform refers to its IMSI/SUPI to IP and/or IMEI/PEI to IP data store (e.g., implemented as a database, such as an SQL database, or another type of data store) maintained by NGFW 202. In this example implementation, the IMSI/SUPI to IP and/or IMEI/PEI to IP mappings can be collected by the security platform using various techniques including inspection of Packet Forwarding Control Protocol (PFCP) messages, APIs, syslog messages, etc. If the IMSI/SUPI to IP and/or IMEI/PEI to IP mappings match a selective intelligent enforcement (SIE) policy rule, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 224. If there is no match, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 228.

As such, in this example implementation, the security platform only has to maintain the session table of flows including IPs mapped to IMSI/SUPI and/or to IMEI/PEI configured in the selective intelligent enforcement (SIE) policy. In this example implementation, the security platform maintains the IMSI/SUPI to IP and/or IMEI/PEI to IP mapping data store of all the User Equipment devices (UEs)

whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent enforcement policy, configured in the security platform. A second session table is maintained for the offloaded flows.

As a second technique for selective intelligent enforcement based on per subscriber identity (e.g., IMSI and/or SUPI) and/or per equipment identity (e.g., IMEI and/or PEI) for mobile networks using a security platform, the security platform receives a first number of packets for inspection (e.g., a first few packets for a new flow). The security platform checks if an IP address(es) associated with the packets match a subscriber identity (e.g., IMSI and/or SUPI) and/or an equipment identity (e.g., IMEI and/or PEI) configured in a policy (e.g., selective intelligent enforcement (SIE) policy rules configured in the policy/security policy). For an IMSI/SUPI to IP and/or IMEI/PEI to IP match, the security platform refers to an IMSI/SUPI to IP and/or IMEI/PEI to IP data store (e.g., implemented as a database, such as an SQL database, or another type of data store) maintained by Smart NIC 204 (e.g., implemented using a Smart NIC, DPU, UPF, or similar device). In this example implementation, the IMSI/SUPI to IP and/or IMEI/PEI to IP mappings can be collected by Smart NIC 204 using various techniques including inspection of PFCP messages, APIs, syslog messages, etc. If the IMSI/SUPI to IP and/or IMEI/PEI to IP mappings match a selective intelligent enforcement (SIE) policy rule, then the security platform initiates/sets up a session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security). If there is no match, then the security platform will instruct the Smart NIC (e.g., Smart NIC 204 implemented using a Smart NIC, DPU, UPF, or similar device) or similar device to offload this session (i.e., bypass security inspection).

As such, in this example implementation, the security platform only has to maintain the session table of flows including IPs mapped to IMSI/SUPI and/or to IMEI/PEI configured in the selective intelligent enforcement (SIE) policy. In this example implementation, in contrast to the above-described first technique, the Smart NIC 204 (e.g., implemented using a Smart NIC, DPU, UPF, or similar device) maintains the IMSI/SUPI to IP and/or IMEI/PEI to IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent enforcement policy, configured in the security platform. A second session table is maintained for the offloaded flows.

As an example, the disclosed techniques for selective intelligent enforcement for mobile networks per subscriber identity (e.g., IMSI and/or SUPI) and/or per equipment identity (e.g., IMEI and/or PEI) using a security platform can be performed to selectively apply application control to network traffic of a network slice and offload the rest of the traffic in the mobile network (e.g., 5G network).

As another example, the disclosed techniques for selective intelligent enforcement for mobile networks per subscriber identity (e.g., IMSI and/or SUPI) and/or per equipment identity (e.g., IMEI and/or PEI) using a security platform can be performed to selectively apply URL filtering to network traffic of a network slice and offload the rest of the traffic in the mobile network (e.g., 5G network).

As yet another example, the disclosed techniques for selective intelligent enforcement for mobile networks per subscriber identity (e.g., IMSI and/or SUPI) and/or per equipment identity (e.g., IMEI and/or PEI) using a security platform can be performed to selectively apply known and unknown threat identification and prevention to network traffic for subscribers/equipment based on their subscriber identity (e.g., IMSI and/or SUPI) and/or equipment identity (e.g., IMEI and/or PEI) and offload the rest of the traffic in the mobile network (e.g., 5G network).

As a further example, the disclosed techniques for selective intelligent enforcement for mobile networks per subscriber identity (e.g., IMSI and/or SUPI) and/or per equipment identity (e.g., IMEI and/or PEI) using a security platform can be performed to deliver selective intelligent enforcement solutions (e.g., including a security platform and devices/hosts including DPUs, Smart NICs, UPFs, etc.) in the mobile network (e.g., 5G network).

Example Use Cases for Selective Intelligent Enforcement for Subscriber Identity and/or Equipment Identity Using a Security Platform for Mobile Networks As a first example use case, mobile network service providers desire to only apply security (e.g., L7 security) to selected 5G enterprise customers to apply security (e.g., to protect subscribers of an enterprise by monitoring downloads as well as command and control (C&C/C2) traffic, to prevent known and unknown malware downloads; to offer security services including decryption to detect malware; and/or to monitor traffic of a group of subscribers for threats, inform and remediate such detected threats, etc.). As such, for security as a service use case, mobile network service providers have a need for a security platform to inspect traffic and apply L7 security to selected 5G enterprise customers only and offload the rest of the data traffic.

As a second example use case, mobile network service providers desire to offer advanced security offerings for IoT customers. Examples of security services include the following: (1) specific application rules to protect IoT devices identified with a list of equipment IDs; and/or (2) to provide active monitoring for malware and C2 over allowed traffic flows.

As will now be apparent to one of ordinary skill in the art, the disclosed techniques for selective intelligent enforcement per subscriber identity and/or per equipment identity for mobile networks using a security platform can be applied in a variety of additional example use case scenarios to detect/prevent these and other types of attacks for facilitating enhanced security for various deployments and environments in mobile networks.

Selective Intelligent Enforcement for Mobile Networks Per Access Point Name and/or Data Network Name Using a Security Platform Generally, there is a need to provide for selective intelligent enforcement per Access Point Name (APN) and/or Data Network Name (DNN) in mobile networks. Specifically, mobile network service providers (e.g., such as AT&T Wireless, Verizon Wireless, etc.) generally desire the capability to apply network security as a security service (e.g., a commercially available security service, such as provided by Palo Alto Networks, Inc., headquartered in Santa Clara, CA, and/or another security service provider) to subscribers connected to secure Access Point Names (APNs) and offload the remaining traffic to improve security analysis performance. Mobile network service providers also desire to selectively apply security (e.g., L7 security) to traffic of certain/selected APNs and/or Data Network Names (DNNs) and offload the remaining traffic (e.g., which may not be inspected due to privacy concerns and/or other legal/regulatory requirements).

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Accordingly, various techniques for providing selective intelligent enforcement per Access Point Name (APN) and/or per Data Network Name (DNN) for mobile networks using a security platform are disclosed as will now be described with respect to FIG. 2C.

Figure 2C:
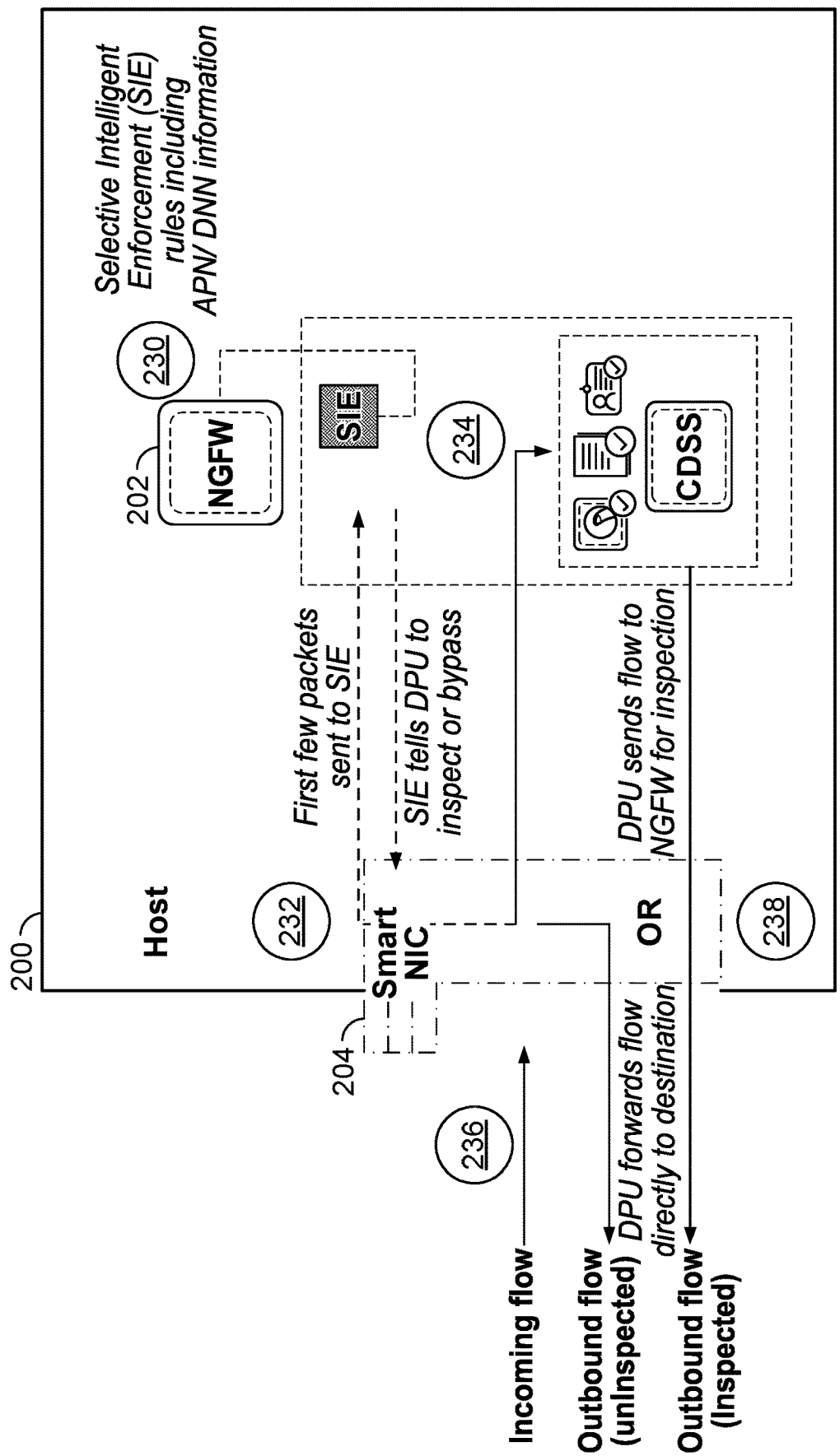
FIG. 2C illustrates selective intelligent enforcement per access point name and/or per data network name for mobile networks using a security platform in accordance with some embodiments.

FIG. 2C illustrates selective intelligent enforcement per access point name and/or per data network name for mobile networks using a security platform in accordance with some embodiments. Referring to FIG. 2C, a security platform includes a network gateway firewall (NGFW) entity 202 (e.g., a virtual/container implemented firewall solution, such as similarly described above) that is executed on a host 200 that also includes a Smart NIC 204. In an example implementation, the security platform is configured with an intelligent traffic offload service as similarly described above with respect to FIG. 2A.

Specifically, the disclosed techniques for selective intelligent enforcement per Access Point Name (APN) and/or per Data Network Name (DNN) for mobile networks using a security platform include applying selective intelligent enforcement (SIE) to network traffic of interest by a security platform (e.g., NFGW 202 using Smart NIC 204 of host 200) and offload the remainder of the traffic (e.g., non-selected flows). The security platform can be deployed in 5G/other mobile networks (e.g., such as shown in FIG. 1) and intelligent enforcement can be per APN and/or per DNN information extracted from monitored network traffic/flows (e.g., based on a policy for SIE based on APN and/or DNN configured for the security platform).

More specifically, the disclosed techniques for selective intelligent enforcement per APN and/or per DNN for mobile networks using a security platform can be performed using two different techniques as will each now be described below.

As a first technique for selective intelligent enforcement per Access Point Name (APN) and/or per Data Network Name (DNN) for mobile networks using a security platform, the security platform receives a first number of packets for inspection (e.g., a first few packets for a new flow) as shown at 232 for an incoming flow 236. The security platform checks if an IP address(es) associated with the packets match an APN and/or a DNN (e.g., also referred to herein as APN/DNN) configured in a policy (e.g., selective intelligent enforcement (SIE) policy rules configured in the policy/security policy) as shown at 230. For an IP to APN/DNN match, the security platform refers to its APN/DNN to IP data store (e.g., implemented as a database, such as an SQL database, or another type of data store) maintained by NGFW 202. In this example implementation, the APN/DNN to IP mappings can be collected by the security platform using various techniques including inspection of Packet Forwarding Control Protocol (PFCP) messages, APIs, syslog messages, etc. If the APN/DNN to IP mappings match a selective intelligent enforcement (SIE) policy rule, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 234. If there is no match, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 238.

As such, in this example implementation, the security platform only has to maintain the session table of flows including IPs mapped to APN/DNN configured in the selective intelligent enforcement (SIE) policy. In this example implementation, the security platform maintains the APN/DNN to IP mapping data store of all the User Equipment devices (UEs) whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent enforcement policy, configured in the security platform. A second session table is maintained for the offloaded flows.

As a second technique for selective intelligent enforcement based on per Access Point Name (APN) and/or per Data Network Name (DNN) for mobile networks using a security platform, the security platform receives a first number of packets for inspection (e.g., a first few packets for a new flow). The security platform checks if an IP address(es) associated with the packets match an APN and/or a DNN configured in a policy (e.g., selective intelligent enforcement (SIE) policy rules configured in the policy/security policy). For an IP to APN/DNN match, the security platform refers to an APN/DNN to IP data store (e.g., implemented as a database, such as an SQL database, or another type of data store) maintained by Smart NIC 204 (e.g., implemented using a Smart NIC, DPU, UPF, or similar device). In this example implementation, the APN/DNN to IP mappings can be collected by Smart NIC 204 using various techniques including inspection of PFCP messages, APIs, syslog messages, etc. If the APN/DNN to IP mappings match a selective intelligent enforcement (SIE) policy rule, then the security platform initiates/sets up a session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security). If there is no match, then the security platform will instruct the Smart NIC (e.g., Smart NIC 204 implemented using a Smart NIC, DPU, UPF, or similar device) or similar device to offload this session (i.e., bypass security inspection).

As such, in this example implementation, the security platform only has to maintain the session table of flows including IPs mapped to an APN/DNN configured in the selective intelligent enforcement (SIE) policy. In this example implementation, in contrast to the above-described first technique, the Smart NIC 204 (e.g., implemented using a Smart NIC, DPU, UPF, or similar device) maintains the APN/DNN to IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent enforcement policy, configured in the security platform. A second session table is maintained for the offloaded flows.

As an example, the disclosed techniques for selective intelligent enforcement for mobile networks per APN and/or per DNN using a security platform can be performed to selectively apply application control to network traffic of a subscriber(s) connected to an APN/DNN and offload the rest of the traffic in the mobile network (e.g., 5G network).

As another example, the disclosed techniques for selective intelligent enforcement for mobile networks per APN and/or per DNN using a security platform can be performed to selectively apply URL filtering to network traffic of a subscriber(s) connected to an APN/DNN and offload the rest of the traffic in the mobile network (e.g., 5G network).

As yet another example, the disclosed techniques for selective intelligent enforcement for mobile networks per APN and/or per DNN using a security platform can be performed to selectively apply known and unknown threat identification and prevention to network traffic of a subscriber(s) connected to an APN/DNN and offload the rest of the traffic in the mobile network (e.g., 5G network).

As a further example, the disclosed techniques for selective intelligent enforcement for mobile networks per APN and/or per DNN using a security platform can be performed to deliver selective intelligent enforcement solutions (e.g., including a security platform and devices/hosts including DPUs, Smart NICs, UPFs, etc.) in the mobile network (e.g., 5G network).

Example Use Cases for Selective Intelligent Enforcement for Access Point Name and/or Data Network Name Using a Security Platform for Mobile Networks As a first example use case, mobile network service providers desire to provide efficient security capabilities to offer security as a service by applying security (e.g., network security) to subscribers connected to one or more APNs (e.g., apply security to subscribers connected to APN—123.secure.apn.com and do not inspect traffic for applying security to all other APNs configured in the PGW or UPF of a core mobile network site).

As a second example use case, mobile network service providers desire to offer advanced security offerings for IoT customers only (e.g., and to provide no security inspection for consumer traffic at a given core mobile network site).

As will now be apparent to one of ordinary skill in the art, the disclosed techniques for selective intelligent enforcement per APN and/or per DNN for mobile networks using a security platform can be applied in a variety of additional example use case scenarios to detect/prevent these and other types of attacks for facilitating enhanced security for various deployments and environments in mobile networks.

Selective Intelligent Enforcement for Mobile Networks Per Location Using a Security Platform Generally, there is a need to provide for selective intelligent enforcement per location in mobile networks. Specifically, mobile network service providers (e.g., such as AT&T Wireless, Verizon Wireless, etc.) generally desire the capability to apply network security based on location of UEs as a security service (e.g., a commercially available security service, such as provided by Palo Alto Networks, Inc., headquartered in Santa Clara, CA, and/or another security service provider) to subscribers based on a specific location associated with their UEs and offload the remaining traffic (i.e., to not perform security inspection on the offloaded traffic) to improve security analysis performance. Enterprise customers (e.g., 5G enterprise customers) also often desire to selectively apply security (e.g., network security) based on location to protect their users working in certain locations (e.g., sensitive locations) and offload the remaining traffic (e.g., to not utilize costly security inspection/firewall resources on all the traffic for all of the enterprise users).

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Accordingly, various techniques for providing selective intelligent enforcement per location for mobile networks using a security platform are disclosed as will now be described with respect to FIG. 2D.

Figure 2D:
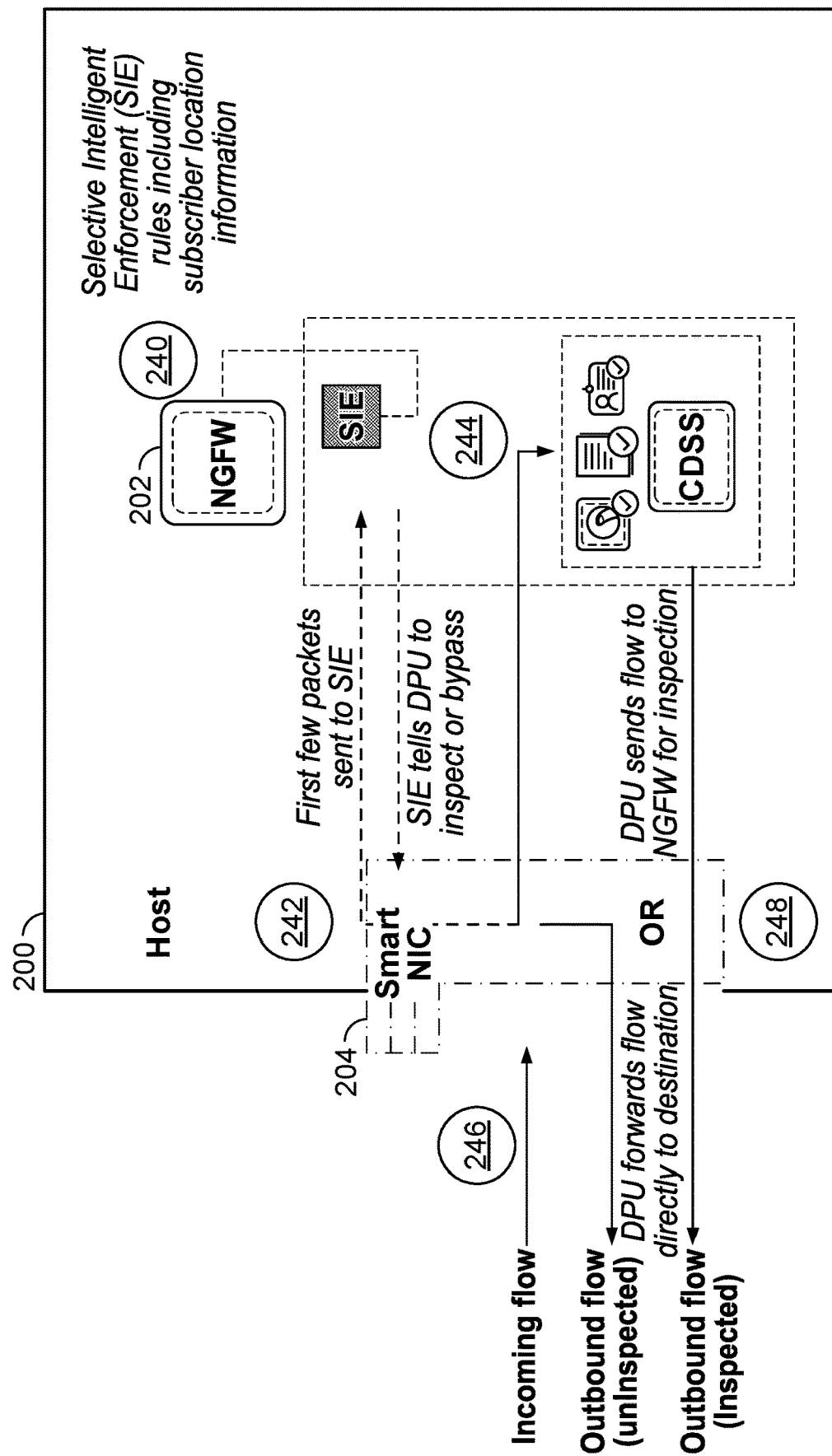
FIG. 2D illustrates selective intelligent enforcement per location for mobile networks using a security platform in accordance with some embodiments.

FIG. 2D illustrates selective intelligent enforcement per location for mobile networks using a security platform in accordance with some embodiments. Referring to FIG. 2D, a security platform includes a network gateway firewall (NGFW) entity 202 (e.g., a virtual/container implemented firewall solution, such as similarly described above) that is executed on a host 200 that also includes a Smart NIC 204. In an example implementation, the security platform is configured with an intelligent traffic offload service as similarly described above with respect to FIG. 2A.

Specifically, the disclosed techniques for selective intelligent enforcement per location for mobile networks using a security platform include applying selective intelligent enforcement (SIE) to network traffic of interest by a security platform (e.g., NFGW 202 using Smart NIC 204 of host 200) and offload the remainder of the traffic (e.g., non-selected flows). The security platform can be deployed in 5G/other mobile networks (e.g., such as shown in FIG. 1) and intelligent enforcement can be per location information extracted from monitored network traffic/flows (e.g., based on a policy for SIE based on location configured for the security platform).

More specifically, the disclosed techniques for selective intelligent enforcement per location for mobile networks using a security platform can be performed using two different techniques to facilitate selective intelligent enforcement based on a subscriber's location information (e.g., and offloading the rest of the traffic) as will each now be described below.

As a first technique for selective intelligent enforcement per location for mobile networks using a security platform, the security platform receives a first number of packets for inspection (e.g., a first few packets for a new flow) as shown at 242 for an incoming flow 246. The security platform checks if an IP address(es) associated with the packets match a location configured in a policy (e.g., selective intelligent enforcement (SIE) policy rules configured in the policy/security policy) as shown at 240. For an IP to location match, the security platform refers to its location to IP data store (e.g., implemented as a database, such as an SQL database, or another type of data store) maintained by NGFW 202. In this example implementation, the location to IP mappings can be collected by the security platform using various techniques including inspection of Packet Forwarding Control Protocol (PFCP) messages, APIs, syslog messages, etc. If the location to IP mappings match a selective intelligent enforcement (SIE) policy rule, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 244. If there is no match, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 248.

As such, in this example implementation, the security platform only has to maintain the session table of flows including IPs mapped to locations configured in the selective intelligent enforcement (SIE) policy. In this example implementation, the security platform maintains the location to the IP mapping data store of all the User Equipment devices (UEs) whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent enforcement policy, configured in the security platform. A second session table is maintained for the offloaded flows.

As a second technique for selective intelligent enforcement based on per location for mobile networks using a security platform, the security platform receives a first number of packets for inspection (e.g., a first few packets for a new flow). The security platform checks if an IP address (es) associated with the packets match a location configured in a policy (e.g., selective intelligent enforcement (SIE) policy rules configured in the policy/security policy). For an IP to location match, the security platform refers to a location to IP data store (e.g., implemented as a database, such as an SQL database, or another type of data store) maintained by Smart NIC 204 (e.g., implemented using a Smart NIC, DPU, UPF, or similar device). In this example implementation, the location to IP mappings can be collected by Smart NIC 204 using various techniques including inspection of PFCP messages, APIs, syslog messages, etc. If the location to IP mappings match a selective intelligent enforcement (SIE) policy rule, then the security platform initiates/sets up a session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security). If there is no match, then the security platform will instruct the Smart NIC (e.g., Smart NIC 204 implemented using a Smart NIC, DPU, UPF, or similar device) or similar device to offload this session (i.e., bypass security inspection).

As such, in this example implementation, the security platform only has to maintain the session table of flows including IPs mapped to locations configured in the selective intelligent enforcement (SIE) policy. In this example implementation, in contrast to the above-described first technique, the Smart NIC 204 (e.g., implemented using a Smart NIC, DPU, UPF, or similar device) maintains the location to the IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent enforcement policy, configured in the security platform. A second session table is maintained for the offloaded flows.

As an example, the disclosed techniques for selective intelligent enforcement for mobile networks per location using a security platform can be performed to selectively apply application control to network traffic of an IP to location mapping and offload the rest of the traffic in the mobile network (e.g., 5G network).

As another example, the disclosed techniques for selective intelligent enforcement for mobile networks per location using a security platform can be performed to selectively apply URL filtering to network traffic of a subscriber's (/s') connected to an APN/DNN associated location and offload the rest of the traffic in the mobile network (e.g., 5G network).

As yet another example, the disclosed techniques for selective intelligent enforcement for mobile networks per location using a security platform can be performed to selectively apply known and unknown threat identification and prevention to network traffic of a subscriber's (/s') associated location and offload the rest of the traffic in the mobile network (e.g., 5G network).

As a further example, the disclosed techniques for selective intelligent enforcement for mobile networks per location using a security platform can be performed to deliver selective intelligent enforcement solutions (e.g., including a security platform and devices/hosts including DPUs, Smart NICs, UPFs, etc.) in the mobile network (e.g., 5G network).

Example Use Cases for Selective Intelligent Enforcement for Location Using a Security Platform for Mobile Networks As a first example use case, mobile network service providers desire to provide efficient security capabilities to offer security as a service by applying security (e.g., network security) to subscribers associated with a location, such as to all users and devices connected to a 5G network on a given floor of a government office building (e.g., and to offload/not inspect the rest of the 5G traffic associated with that government office building). An example location type can be specified as a Civic Address in 5G (e.g., see 3GPP TS 29.572, which is publicly available at https://www.etsi.org/deliver/etsi_ts/129500_129599/129572/16.06.00_60/ts_129572v160600p.p df) by the following: country, state, county, neighborhood, block, street, suffix, zip code, floor, and/or room.

As a second example use case, mobile network service providers and/or their enterprise customers desire to apply security to critical infrastructure sensors located at certain GPS locations only (e.g., sensors connected to a 5G Multi-access Edge Computing (MEC)). An example GPS location type can be specified as latitude, longitude, and altitude in 5G (e.g., see ETSI GS MEC 013 which V3.1.1, is publicly available at https://www.etsi.org/deliver/etsi_gs/MEC/001_099/013/03.01.01_60/gs_MEC013v030101p.pdf) . . . .

As will now be apparent to one of ordinary skill in the art, the disclosed techniques for selective intelligent enforcement per location for mobile networks using a security platform can be applied in a variety of additional example use case scenarios to detect/prevent these and other types of attacks for facilitating enhanced security for various deployments and environments in mobile networks.

Selective Intelligent Enforcement for Mobile Networks Per Radio Access Technology Using a Security Platform Generally, there is a need to provide for selective intelligent enforcement per Radio Access Technology (RAT) in mobile networks. Specifically, mobile network service providers (e.g., such as AT&T Wireless, Verizon Wireless, etc.) generally desire the capability to apply network security based on RAT as a security service (e.g., a commercially available security service, such as provided by Palo Alto Networks, Inc., headquartered in Santa Clara, CA, and/or another security service provider) to subscribers based on RAT (e.g., to only apply security to Narrow Band IoT (NB-IoT) traffic) and offload the remaining traffic (i.e., to not perform security inspection on the offloaded traffic) to improve security analysis performance.

Examples of Radio Access Technologies in mobile networks include the following (e.g., as specified in 3GPP TS 29.571, which is publicly available at https://www.etsi.org/deliver/etsi_ts/129500_129599/129571/16.06.00_60/ts_129571v160600p.p df): New Radio (NR) access type, WLAN (e.g., untrusted Wireless LAN (IEEE 802.11)) access type, Wireline Cable access type, and New Radio Low Earth Orbit (NR LEO) satellite access type.

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Accordingly, various techniques for providing selective intelligent enforcement per RAT for mobile networks using a security platform are disclosed as will now be described with respect to FIG. 2E.

Figure 2E:
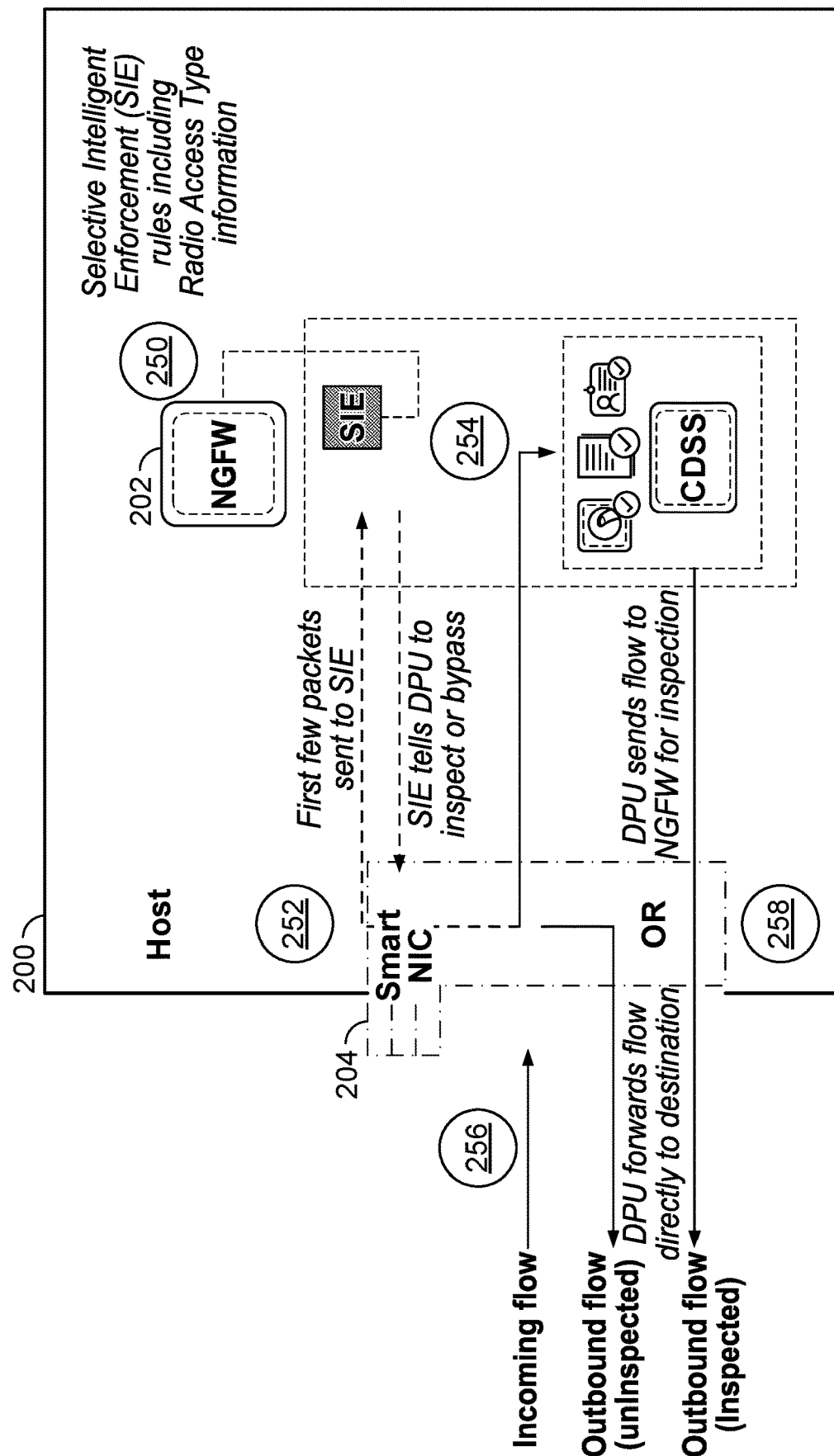
FIG. 2E illustrates selective intelligent enforcement per Radio Access Technology for mobile networks using a security platform in accordance with some embodiments.

FIG. 2E illustrates selective intelligent enforcement per Radio Access Technology for mobile networks using a security platform in accordance with some embodiments. Referring to FIG. 2E, a security platform includes a network gateway firewall (NGFW) entity 202 (e.g., a virtual/container implemented firewall solution, such as similarly described above) that is executed on a host 200 that also includes a Smart NIC 204. In an example implementation, the security platform is configured with an intelligent traffic offload service as similarly described above with respect to FIG. 2A.

Specifically, the disclosed techniques for selective intelligent enforcement per Radio Access Technology (RAT) for mobile networks using a security platform include applying selective intelligent enforcement (SIE) to network traffic of interest by a security platform (e.g., NFGW 202 using Smart NIC 204 of host 200) and offload the remainder of the traffic (e.g., non-selected flows). The security platform can be deployed in 5G/other mobile networks (e.g., such as shown in FIG. 1) and intelligent enforcement can be per RAT type information extracted from monitored network traffic/flows (e.g., based on a policy for SIE based on RAT type configured for the security platform).

More specifically, the disclosed techniques for selective intelligent enforcement per RAT for mobile networks using a security platform can be performed using two different techniques to facilitate selective intelligent enforcement based on a subscriber's associated RAT type information (e.g., and offloading the rest of the traffic) as will each now be described below.

As a first technique for selective intelligent enforcement per RAT type for mobile networks using a security platform, the security platform receives a first number of packets for inspection (e.g., a first few packets for a new flow) as shown at 252 for an incoming flow 256. The security platform checks if an IP address(es) associated with the packets match a RAT type configured in a policy (e.g., selective intelligent enforcement (SIE) policy rules configured in the policy/security policy) as shown at 250. For an IP to RAT type match, the security platform refers to its RAT type to IP data store (e.g., implemented as a database, such as an SQL database, or another type of data store) maintained by NGFW 202. In this example implementation, the RAT type to IP mappings can be collected by the security platform using various techniques including inspection of Packet Forwarding Control Protocol (PFCP) messages, APIs, syslog messages, etc. If the RAT type to IP mappings match a selective intelligent enforcement (SIE) policy rule, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 254. If there is no match, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 258.

As such, in this example implementation, the security platform only has to maintain the session table of flows including IPs mapped to RAT type configured in the selective intelligent enforcement (SIE) policy. In this example implementation, the security platform maintains the RAT type to the IP mapping data store of all the User Equipment devices (UEs) whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent enforcement policy, configured in the security platform. A second session table is maintained for the offloaded flows.

As a second technique for selective intelligent enforcement based on per RAT type for mobile networks using a security platform, the security platform receives a first number of packets for inspection (e.g., a first few packets for a new flow). The security platform checks if an IP address(es) associated with the packets match a RAT type configured in a policy (e.g., selective intelligent enforcement (SIE) policy rules configured in the policy/security policy). For an IP to RAT type match, the security platform refers to a RAT type to IP data store (e.g., implemented as a database, such as an SQL database, or another type of data store) maintained by Smart NIC 204 (e.g., implemented using a Smart NIC, DPU, UPF, or similar device). In this example implementation, the RAT type to IP mappings can be collected by Smart NIC 204 using various techniques including inspection of PFCP messages, APIs, syslog messages, etc. If the RAT type to IP mappings match a selective intelligent enforcement (SIE) policy rule, then the security platform initiates/sets up a session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security). If there is no match, then the security platform will instruct the Smart NIC (e.g., Smart NIC 204 implemented using a Smart NIC, DPU, UPF, or similar device) or similar device to offload this session (i.e., bypass security inspection).

As such, in this example implementation, the security platform only has to maintain the session table of flows including IPs mapped to RAT type configured in the selective intelligent enforcement (SIE) policy. In this example implementation, in contrast to the above-described first technique, the Smart NIC 204 (e.g., implemented using a Smart NIC, DPU, UPF, or similar device) maintains the RAT type to the IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent enforcement policy, configured in the security platform. A second session table is maintained for the offloaded flows.

As an example, the disclosed techniques for selective intelligent enforcement for mobile networks per RAT type using a security platform can be performed to selectively apply application control to network traffic of an IP to RAT type mapping and offload the rest of the traffic in the mobile network (e.g., 5G network).

As another example, the disclosed techniques for selective intelligent enforcement for mobile networks per RAT type using a security platform can be performed to selectively apply URL filtering to network traffic of a subscriber's associated RAT type and offload the rest of the traffic in the mobile network (e.g., 5G network).

As yet another example, the disclosed techniques for selective intelligent enforcement for mobile networks per RAT type using a security platform can be performed to selectively apply known and unknown threat identification and prevention to network traffic of a subscriber's associated RAT type and offload the rest of the traffic in the mobile network (e.g., 5G network).

As a further example, the disclosed techniques for selective intelligent enforcement for mobile networks per RAT type using a security platform can be performed to deliver selective intelligent enforcement solutions (e.g., including a security platform and devices/hosts including DPUs, Smart NICs, UPFs, etc.) in the mobile network (e.g., 5G network).

Example Use Cases for Selective Intelligent Enforcement for Radio Access Technology Using a Security Platform for Mobile Networks As a first example use case, mobile network service providers desire a security platform solution that can inspect and apply security (e.g., layer 7 (L7) security) to traffic of all subscribers connected via satellite access to their mobile networks (e.g., 5G network) (e.g., and do not want to inspect the rest of the subscribers, such as due to various costs associated with such security inspection). Examples of such satellite access can be specified via RAT in 5G networks, including the following types of satellite access: (1) NR_LEO satellite access type; (2) NR_MEO satellite access type; (3) NR_GEO satellite access type; and/or (4) NR_OTHER_SAT satellite access type.

As a second example use case, enterprise customers desire to have a mobile network security solution that can inspect and apply security (e.g., L7 security) to traffic from guest wireless access and to not perform/bypass such inspection for the rest of the traffic that is associated with trusted access RAT types. Examples of such wireless access can be specified via RAT in 5G networks, including the following types of wireless access: (1) WLAN-Untrusted Wireless LAN (IEEE 802.11) access; and/or (2) TRUSTED_WLAN-Trusted Wireless LAN (IEEE 802.11) access.

As will now be apparent to one of ordinary skill in the art, the disclosed techniques for selective intelligent enforcement per Radio Access Technology for mobile networks using a security platform can be applied in a variety of additional example use case scenarios to detect/prevent these and other types of attacks for facilitating enhanced security for various deployments and environments in mobile networks.

Overview of Techniques for Providing Selective Offloading of Traffic for Mobile Networks Using a Security Platform Various techniques for providing selective offloading for mobile networks using a security platform will now be described with respect to various embodiments.

In one embodiment, techniques for applying selective offloading per network slice in mobile networks are described below with respect to various embodiments.

In one embodiment, techniques for applying selective offloading per subscriber identity and/or equipment identity in mobile networks are described below with respect to various embodiments.

In one embodiment, techniques for applying selective offloading per access point name/data network name (APN/DNN) in mobile networks are described below with respect to various embodiments.

In one embodiment, techniques for applying selective offloading per location in mobile networks are described below with respect to various embodiments.

In one embodiment, techniques for applying selective offloading per Radio Access Technology (RAT) type in mobile networks are described below with respect to various embodiments.

In some embodiments, techniques for applying selective offloading per network slice, per subscriber identity and/or equipment identity, per APN/DNN, per location, and/or per RAT type in mobile networks are described below with respect to various embodiments.

These and other techniques for providing selective offloading of traffic for mobile networks using a security platform will now be further described below with respect to various embodiments.

Example Embodiments for Selective Offloading of Traffic for Mobile Networks Using a Security Platform Selective Offloading for Mobile Networks Per Network Slice Using a Security Platform Generally, there is a need to provide for selective offloading of traffic per network slice in mobile networks. Specifically, mobile network service providers (e.g., such as AT&T Wireless, Verizon Wireless, etc.) generally desire the capability to offload traffic of network slices that cannot be inspected due to privacy concerns. Mobile network service providers also desire the capability to offload traffic of network slices that cannot be inspected due to legal/regulatory/other requirements. In addition, many mobile network service providers' security do not see significant value to inspect traffic of network slices for consumer traffic (e.g., absent an additional security inspection for certain subscribers).

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Accordingly, various techniques for providing selective offloading of traffic based on network slice information (S-NSSAI) for mobile networks using a security platform are disclosed as will now be described with respect to FIG. 3A.

Figure 3A:
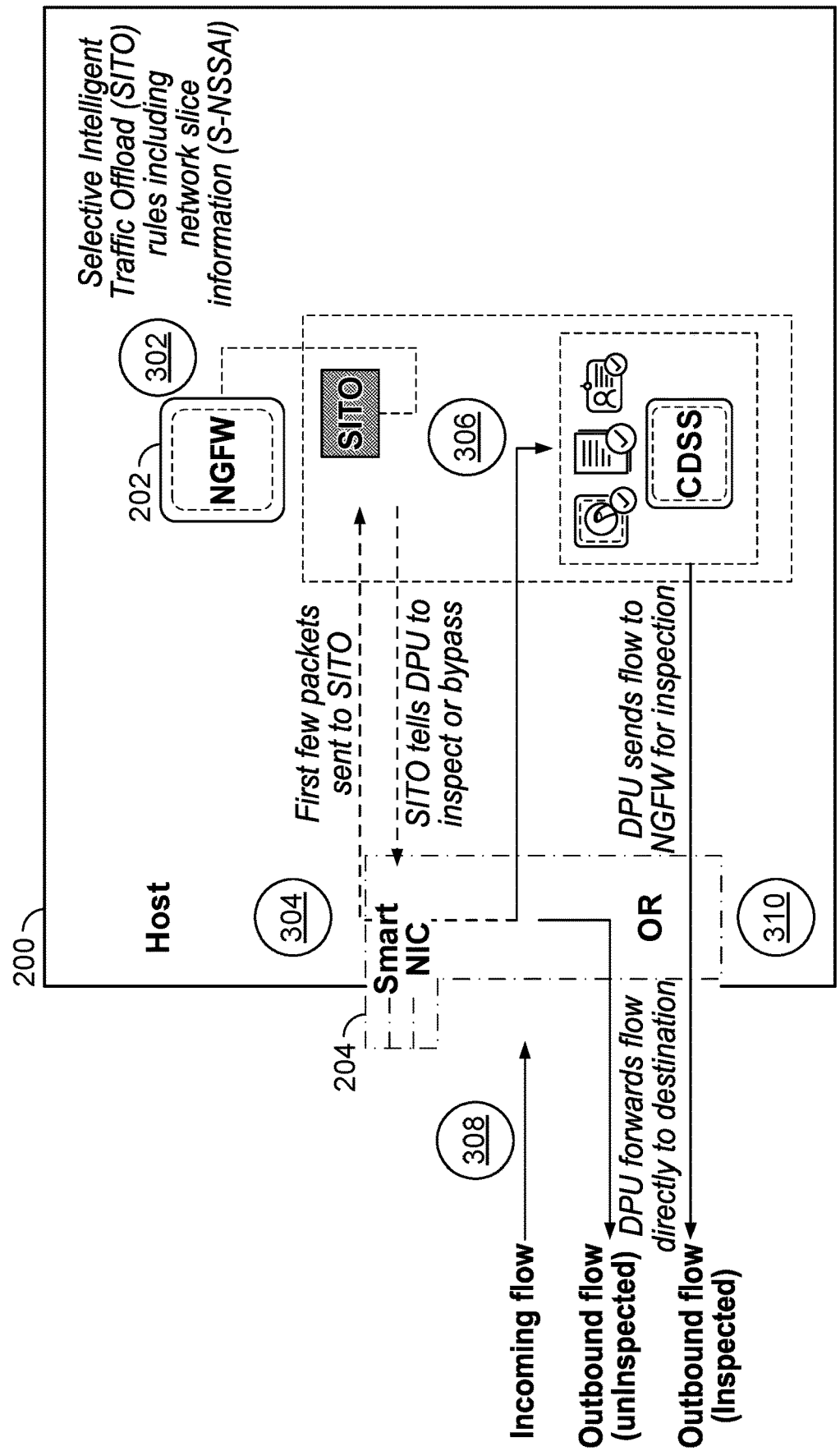
FIG. 3A illustrates selective offload based on network slice information (S-NSSAI) for mobile networks using a security platform in accordance with some embodiments.

FIG. 3A illustrates selective offload based on network slice information (S-NSSAI) for mobile networks using a security platform in accordance with some embodiments.

Referring to FIG. 3A, a security platform includes a network gateway firewall (NGFW) entity 202 (e.g., a virtual/container implemented firewall solution, such as similarly described above) that is executed on a host 200 that also includes a Smart NIC 204.

In an example implementation, the security platform is configured with an intelligent traffic offload service as further described herein, and the security platform eliminates the tradeoff between network performance and enhanced security protection provided by selective traffic inspection/offloading. Specifically, the disclosed intelligent traffic offload service integrates with commercially available Smart NICs (e.g., NVIDIA BlueField-3 DPU and/or other commercially available Smart NICs with DPU capabilities) to significantly improve the security platform performance in mobile network environments. For example, for each new flow on the network, the disclosed intelligent traffic offload service can determine whether the flow can benefit from security inspection or not. The determination can be performed based on a policy or based on the flow's inability to be inspected (e.g., certain encrypted traffic). If the flow is determined to bypass security inspection/analysis, then the flow is offloaded to the Smart NIC saving the need for the firewall (e.g., NFGW 202) to analyze it, leading to a reduction in load on the firewall and thereby can significantly improve performance for security analysis in mobile network environments.

In an example implementation, the disclosed techniques for providing an intelligent traffic offload service that effectively and efficiently integrates with commercially available Smart NICs (e.g., NVIDIA BlueField-3 DPU and/or other commercially available Smart NICs with DPU capabilities) to significantly improve the security platform performance in mobile network environments is further described in U.S. Pat. No. 11,665,139 entitled DISTRIBUTED OFFLOAD LEVERAGING DIFFERENT OFFLOAD DEVICES filed Apr. 30, 2021, issued May 30, 2023, which is incorporated herein by reference for all purposes.

Specifically, the disclosed techniques for selective intelligent traffic offload based on network slice information (S-NSSAI) for mobile networks using a security platform include applying selective intelligent traffic offload of network traffic by a security platform to a Smart NIC (e.g., NFGW 202 using Smart NIC 204 of host 200) and inspecting the remainder of the traffic (e.g., selected flows) using the security platform (e.g., NFGW 202). The security platform can be deployed in 5G/other mobile networks (e.g., such as shown in FIG. 1) and the selective intelligent offloading can be based on network slice (S-NSSAI) information extracted from monitored network traffic/flows (e.g., based on a policy for selective intelligent offloading based on S-NSSAI configured for the security platform). The S-NSSAI includes two attributes: the SST (Slice/Service Type) and an optional SD (Slice Differentiator).

More specifically, the disclosed techniques for selective intelligent offloading based on network slice information (S-NSSAI) for mobile networks using a security platform can be performed using two different techniques as will each now be described below.

As a first technique for selective intelligent offloading based on network slice information (S-NSSAI) for mobile networks using a security platform, the security platform receives a first number of packets for inspection (e.g., a first few packets for a new flow) as shown at 304 for an incoming flow 308. The security platform checks if an IP address(es) associated with the packets match a network slice configured in a policy (e.g., selective intelligent offloading (SITO) policy rules configured in the policy/security policy) as shown at 302. For an IP to network slice match, the security platform refers to its S-NSSAI to IP data store (e.g., implemented as a database, such as an SQL database, or another type of data store) maintained by NGFW 202. In this example implementation, the S-NSSAI to IP mappings can be collected by the security platform using various techniques including inspection of Packet Forwarding Control Protocol (PFCP) messages, APIs, syslog messages, etc. If the S-NSSAI to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 310. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 306.

As such, in this example implementation, the security platform only has to maintain the session table of flows including IPs mapped to network slices configured in the selective intelligent offloading (SITO) policy. In this example implementation, the security platform maintains the Network Slice to the IP mapping data store of all the User Equipment devices (UEs) whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent offload policy, configured in the security platform. A second session table is maintained for the flows forwarded to the security platform for inspection.

As a second technique for selective intelligent offloading based on network slice information (S-NSSAI) for mobile networks using a security platform, the security platform receives a first number of packets for inspection (e.g., a first few packets for a new flow). The security platform checks if an IP address(es) associated with the packets match a network slice configured in a policy (e.g., selective intelligent offloading (SITO) policy rules configured in the policy/security policy). For an IP to network slice match, the security platform refers to an S-NSSAI to IP data store (e.g., implemented as a database, such as an SQL database, or another type of data store) maintained by Smart NIC 204 (e.g., implemented using a Smart NIC, DPU, UPF, or similar device). In this example implementation, the S-NSSAI to IP mappings can be collected by Smart NIC 204 using various techniques including inspection of PFCP messages, APIs, syslog messages, etc. If the S-NSSAI to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 310. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 306.

As such, in this example implementation, the security platform only has to maintain the session table of flows including IPs mapped to network slices configured in the selective intelligent offloading (SITO) policy. In this example implementation, in contrast to the above-described first technique, the Smart NIC 204 (e.g., implemented using a Smart NIC, DPU, UPF, or similar device) maintains the Network Slice to the IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent offloading policy, configured in the security platform. A second session table is maintained for the flows forwarded to the security platform for inspection.

As an example, the disclosed techniques for selective intelligent offloading for mobile networks per network slice using a security platform can be performed to selectively offload traffic/flows of subscribers configured in a network slice(s) in the mobile network (e.g., 5G network) and to apply application control to the rest of the traffic/flows in the mobile network (e.g., 5G network).

As another example, the disclosed techniques for selective intelligent offloading for mobile networks per network slice using a security platform can be performed to selectively offload traffic/flows of subscribers configured in a network slice(s) in the mobile network (e.g., 5G network) and to apply URL filtering to the rest of the traffic/flows in the mobile network (e.g., 5G network).

As yet another example, the disclosed techniques for selective intelligent offloading for mobile networks per network slice using a security platform can be performed to selectively offload traffic/flows of subscribers configured in a network slice(s) in the mobile network (e.g., 5G network) and to apply known and unknown threat identification and prevention to network traffic of a network slice.

As a further example, the disclosed techniques for selective intelligent offloading for mobile networks per network slice using a security platform can be performed to deliver a selective intelligent offloading solution (e.g., including a security platform and devices/hosts including DPUs, Smart NICs, UPFs, etc.) in the mobile network (e.g., 5G network).

Example Use Cases for Selective Offloading Per Network Slice Using a Security Platform for Mobile Networks As a first example use case, mobile network service providers desire to offload traffic of some government customers. In this example use case, certain federal/state/other government customers of mobile network service providers may have legal/regulatory/other restrictions that do not permit for traffic inspection, in which case, such traffic should be offloaded to bypass any such security inspection of the traffic.

As a second example use case, mobile network service providers often desire to offload traffic of certain/all 5G consumer traffic (e.g., at least if such subscribers are not paying for a security subscription to inspect their traffic for security risks, malware, etc.).

As will now be apparent to one of ordinary skill in the art, the disclosed techniques for selective offloading of traffic per network slice for mobile networks using a security platform can be applied in a variety of additional example use case scenarios to detect/prevent these and other types of attacks for facilitating enhanced security for various deployments and environments in mobile networks.

Selective Offloading for Mobile Networks Per Subscriber Identity and/or Equipment Identity Using a Security Platform Generally, there is a need to provide for selective offloading of traffic per subscriber identity and/or equipment identity in mobile networks. Specifically, mobile network service providers (e.g., such as AT&T Wireless, Verizon Wireless, etc.) generally desire the capability to offload traffic of certain selected subscribers (e.g., selected based on subscriber identity and/or equipment identity) and to not apply deep packet inspection (DPI) to such offloaded traffic (e.g., security inspection using DPI, such as for threat detection, etc.). As another example, customers typically do not view security inspection of trusted subscribers/devices as having significant value. Mobile network service providers also desire the capability to offload traffic of certain selected subscribers (e.g., selected based on subscriber identity and/or equipment identity) that cannot be inspected due to legal/regulatory/other requirements.

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Accordingly, various techniques for providing selective offloading of traffic per subscriber identity (e.g., IMSI and/or SUPI) and/or per equipment identity (e.g., IMEI and/or PEI) for mobile networks using a security platform are disclosed as will now be described with respect to FIG. 3B.

Figure 3B:
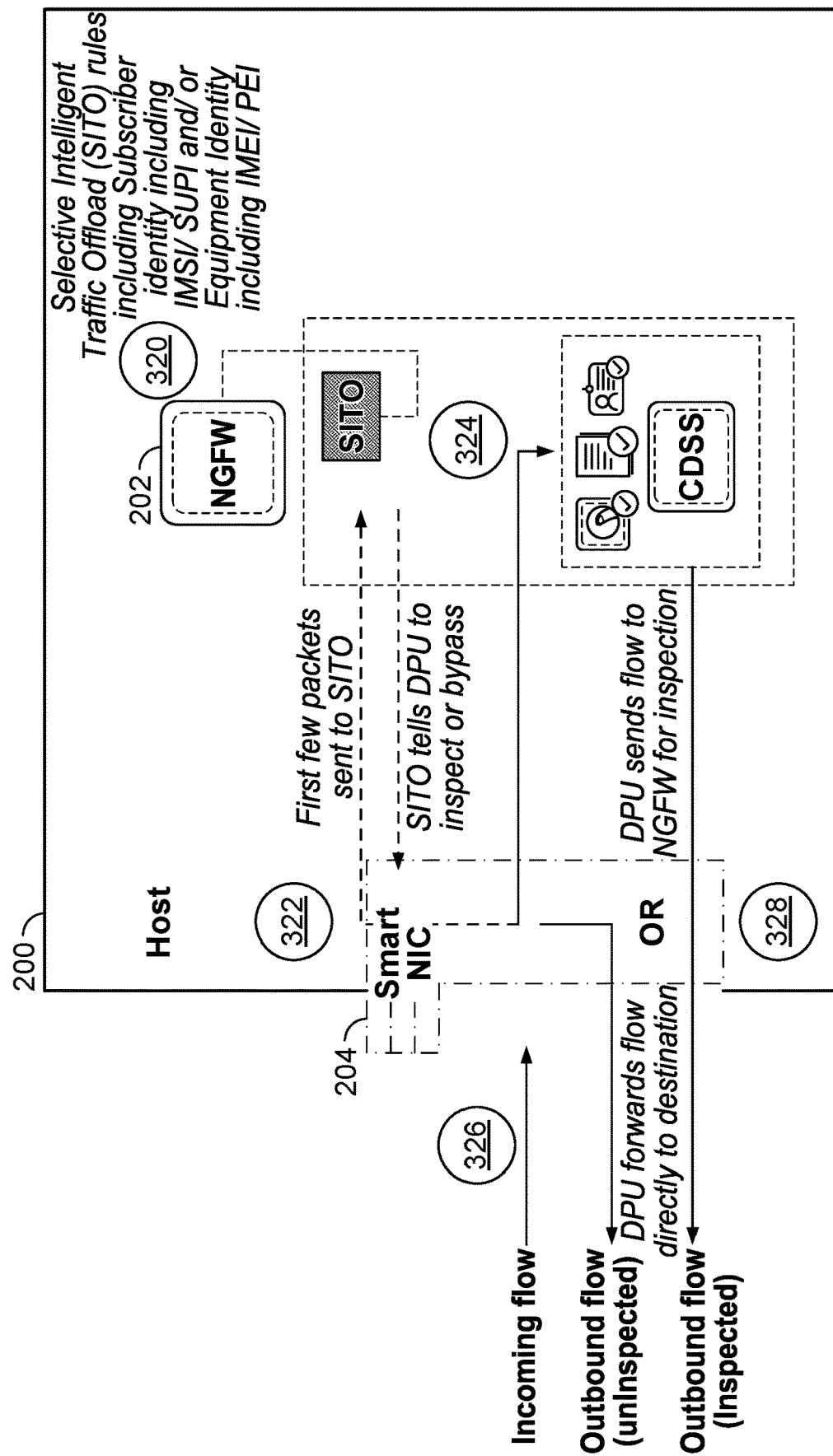
FIG. 3B illustrates selective offload per subscriber identity and/or equipment identity for mobile networks using a security platform in accordance with some embodiments.

FIG. 3B illustrates selective offload per subscriber identity and/or equipment identity for mobile networks using a security platform in accordance with some embodiments. Referring to FIG. 3B, a security platform includes a network gateway firewall (NGFW) entity 202 (e.g., a virtual/container implemented firewall solution, such as similarly described above) that is executed on a host 200 that also includes a Smart NIC 204. In an example implementation, the security platform is configured with an intelligent traffic offload service as similarly described above with respect to FIG. 3A.

Specifically, the disclosed techniques for selective intelligent traffic offload per subscriber identity (e.g., IMSI and/or SUPI) and/or per equipment identity (e.g., IMEI and/or PEI) for mobile networks using a security platform include applying selective intelligent traffic offload of network traffic by a security platform to a Smart NIC (e.g., NFGW 202 using Smart NIC 204 of host 200) and inspecting the remainder of the traffic (e.g., selected flows) using the security platform (e.g., NFGW 202). The security platform can be deployed in 5G/other mobile networks (e.g., such as shown in FIG. 1) and the selective intelligent offloading can be based on subscriber identity (e.g., IMSI and/or SUPI) and/or equipment identity (e.g., IMEI and/or PEI) information extracted from monitored network traffic/flows (e.g., based on a policy for selective intelligent offloading based on subscriber identity (e.g., IMSI and/or SUPI) and/or equipment identity (e.g., IMEI and/or PEI) configured for the security platform).

More specifically, the disclosed techniques for selective intelligent offloading based on subscriber identity (e.g., IMSI and/or SUPI) and/or equipment identity (e.g., IMEI and/or PEI) for mobile networks using a security platform can be performed using two different techniques as will each now be described below.

As a first technique for selective intelligent offloading based on subscriber identity (e.g., IMSI and/or SUPI) and/or equipment identity (e.g., IMEI and/or PEI) information for mobile networks using a security platform, the security platform receives a first number of packets for inspection (e.g., a first few packets for a new flow) as shown at 322 for an incoming flow 326. The security platform checks if an IP address(es) associated with the packets match a subscriber identity (e.g., IMSI and/or SUPI) and/or an equipment identity (e.g., IMEI and/or PEI) configured in a policy (e.g., selective intelligent offloading (SITO) policy rules configured in the policy/security policy) as shown at 320. For an IP to subscriber identity (e.g., IMSI and/or SUPI) and/or equipment identity (e.g., IMEI and/or PEI) match, the security platform refers to its subscriber identity (e.g., IMSI and/or SUPI) and/or equipment identity (e.g., IMEI and/or PEI) to IP data store (e.g., implemented as a database, such as an SQL database, or another type of data store) maintained by NGFW 202. In this example implementation, the subscriber identity (e.g., IMSI and/or SUPI) and/or equipment identity (e.g., IMEI and/or PEI) to IP mappings can be collected by the security platform using various techniques including inspection of Packet Forwarding Control Protocol (PFCP) messages, APIs, syslog messages, etc. If the subscriber identity (e.g., IMSI and/or SUPI) and/or equipment identity (e.g., IMEI and/or PEI) to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 328. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 324.

As such, in this example implementation, the security platform only has to maintain the session table of flows including IPs mapped to subscriber identity (e.g., IMSI and/or SUPI) and/or equipment identity (e.g., IMEI and/or PEI) information configured in the selective intelligent offloading (SITO) policy. In this example implementation, the security platform maintains the subscriber identity (e.g., IMSI and/or SUPI) and/or equipment identity (e.g., IMEI and/or PEI) to the IP mapping data store of all the User Equipment devices (UEs) whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent offload policy, configured in the security platform. A second session table is maintained for the flows forwarded to the security platform for inspection.

As a second technique for selective intelligent offloading based on subscriber identity (e.g., IMSI and/or SUPI) and/or equipment identity (e.g., IMEI and/or PEI) information for mobile networks using a security platform, the security platform receives a first number of packets for inspection (e.g., a first few packets for a new flow). The security platform checks if an IP address(es) associated with the packets match a subscriber identity (e.g., IMSI and/or SUPI) and/or an equipment identity (e.g., IMEI and/or PEI) configured in a policy (e.g., selective intelligent offloading (SITO) policy rules configured in the policy/security policy). For an IP to subscriber identity (e.g., IMSI and/or SUPI) and/or equipment identity (e.g., IMEI and/or PEI) match, the security platform refers to a subscriber identity (e.g., IMSI and/or SUPI) and/or equipment identity (e.g., IMEI and/or PEI) to IP data store (e.g., implemented as a database, such as an SQL database, or another type of data store) maintained by Smart NIC 204 (e.g., implemented using a Smart NIC, DPU, UPF, or similar device). In this example implementation, the subscriber identity (e.g., IMSI and/or SUPI) and/or equipment identity (e.g., IMEI and/or PEI) to IP mappings can be collected by Smart NIC 204 using various techniques including inspection of PFCP messages, APIs, syslog messages, etc. If the subscriber identity (e.g., IMSI and/or SUPI) and/or equipment identity (e.g., IMEI and/or PEI) to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 328. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 324.

As such, in this example implementation, the security platform only has to maintain the session table of flows including IPs mapped to subscriber identity (e.g., IMSI and/or SUPI) and/or equipment identity (e.g., IMEI and/or PEI) information configured in the selective intelligent offloading (SITO) policy. In this example implementation, in contrast to the above-described first technique, the Smart NIC 204 (e.g., implemented using a Smart NIC, DPU, UPF, or similar device) maintains the subscriber identity (e.g., IMSI and/or SUPI) and/or equipment identity (e.g., IMEI and/or PEI) to the IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent offloading policy, configured in the security platform. A second session table is maintained for the flows forwarded to the security platform for inspection.

As an example, the disclosed techniques for selective intelligent offloading for mobile networks per subscriber identity (e.g., IMSI and/or SUPI) and/or equipment identity (e.g., IMEI and/or PEI) using a security platform can be performed to selectively offload traffic/flows of subscribers (e.g., based on IMSI and/or SUPI) and/or equipment (e.g., based on IMEI and/or PEI) in the mobile network (e.g., 5G network) and to apply application control to the rest of the traffic/flows in the mobile network (e.g., 5G network).

As another example, the disclosed techniques for selective intelligent offloading for mobile networks per subscriber identity (e.g., IMSI and/or SUPI) and/or equipment identity (e.g., IMEI and/or PEI) using a security platform can be performed to selectively offload traffic/flows of subscribers (e.g., based on IMSI and/or SUPI) and/or equipment (e.g., based on IMEI and/or PEI) in the mobile network (e.g., 5G network) and to apply URL filtering to the rest of the traffic/flows in the mobile network (e.g., 5G network).

As yet another example, the disclosed techniques for selective intelligent offloading for mobile networks per subscriber identity (e.g., IMSI and/or SUPI) and/or equipment identity (e.g., IMEI and/or PEI) using a security platform can be performed to selectively offload traffic/flows of subscribers (e.g., based on IMSI and/or SUPI) and/or equipment (e.g., based on IMEI and/or PEI) in the mobile network (e.g., 5G network) and to apply known and unknown threat identification and prevention to the rest of the network traffic/flows.

As a further example, the disclosed techniques for selective intelligent offloading for mobile networks per subscriber identity (e.g., IMSI and/or SUPI) and/or equipment identity (e.g., IMEI and/or PEI) using a security platform can be performed to deliver a selective intelligent offloading solution (e.g., including a security platform and devices/hosts including DPUs, Smart NICs, UPFs, etc.) in the mobile network (e.g., 5G network).

Example Use Cases for Selective Offloading Per Subscriber Identity and/or Equipment Identity Using a Security Platform for Mobile Networks As a first example use case, mobile network service providers desire to offload traffic of subscribers with security clearances. In this example use case, certain federal/state/other government customers of mobile network service providers may have subscribers with certain levels of security clearances (e.g., confidential; secret; top secret; top secret, compartmented information; etc.). As such, there can be various legal/regulatory/other restrictions that do not permit for traffic inspection, in which case, such traffic should be offloaded to bypass any such security inspection of the traffic.

As a second example use case, some enterprise customers desire to offload traffic of certain/all traffic of trusted employees/devices (e.g., based on subscriber identity and/or equipment identity), such as for C-suite business executives and/or other trusted employees/devices.

As will now be apparent to one of ordinary skill in the art, the disclosed techniques for selective offloading of traffic per subscriber identity and/or equipment identity for mobile networks using a security platform can be applied in a variety of additional example use case scenarios to detect/prevent these and other types of attacks for facilitating enhanced security for various deployments and environments in mobile networks.

Selective Offloading for Mobile Networks Per Access Point Name and/or Data Network Name Using a Security Platform Generally, there is a need to provide for selective offloading of traffic per Access Point Name (APN) and/or Data Network Name (DNN) in mobile networks. Specifically, mobile network service providers (e.g., such as AT&T Wireless, Verizon Wireless, etc.) generally desire the capability to offload traffic of certain selected subscribers (e.g., selected based on subscribers connected to a certain APN/DNN, such as consumer APNs and/or Internet APNs) and to not apply deep packet inspection (DPI) to such offloaded traffic (e.g., security inspection using DPI, as there may not be significant security value or revenue for inspecting such traffic using the security platform). As another example, mobile network service providers also desire the capability to offload traffic of certain selected subscribers (e.g., selected based on subscribers connected to a certain APN/DNN) that cannot be inspected due to privacy concerns and/or legal/regulatory/other requirements.

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Accordingly, various techniques for providing selective offloading of traffic per Access Point Name (APN) and/or Data Network Name (DNN) for mobile networks using a security platform are disclosed as will now be described with respect to FIG. 3C.

Figure 3C:
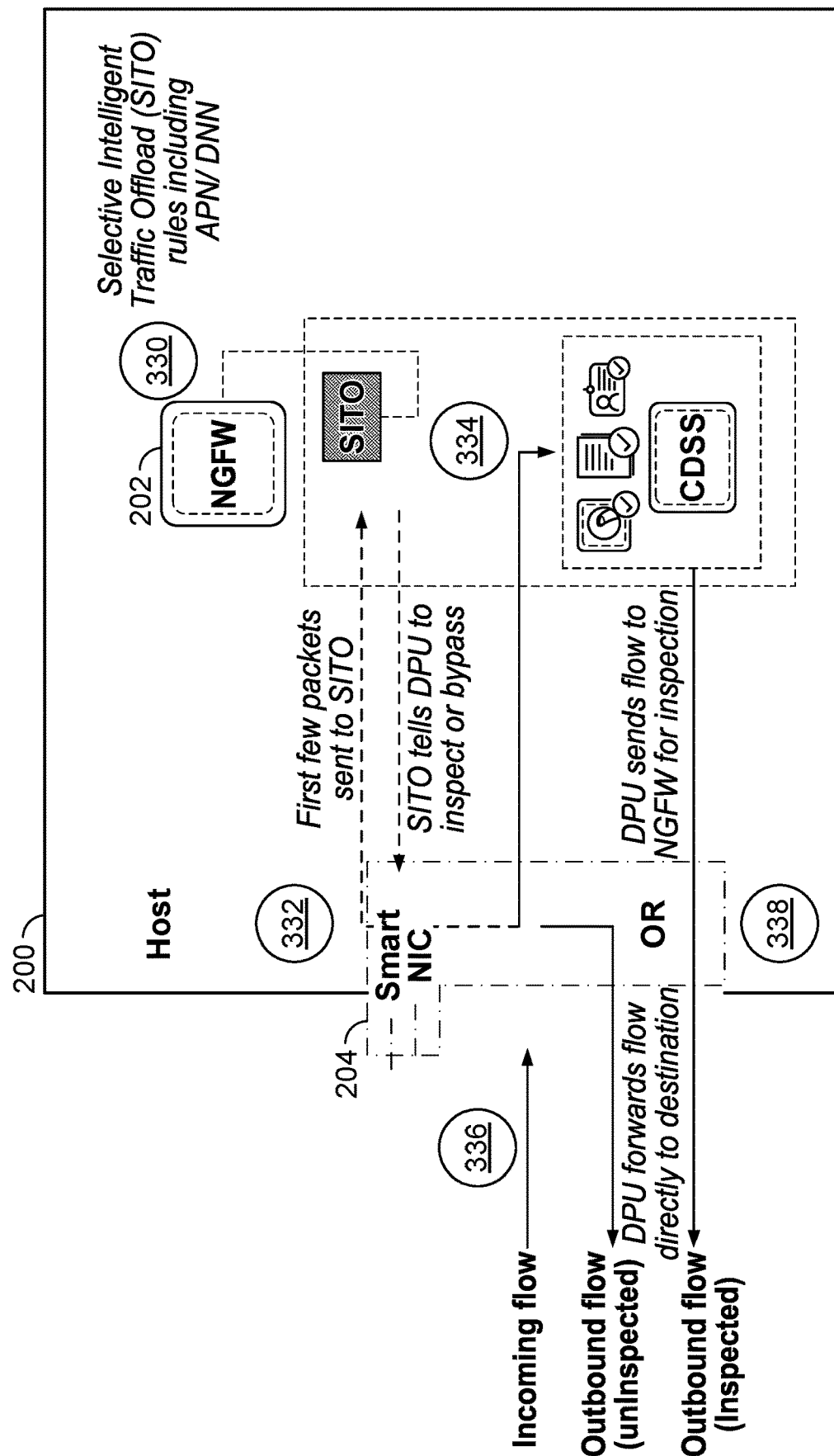
FIG. 3C illustrates selective intelligent enforcement per access point name and/or per data network name for mobile networks using a security platform in accordance with some embodiments.

FIG. 3C illustrates selective intelligent enforcement per access point name and/or per data network name for mobile networks using a security platform in accordance with some embodiments. Referring to FIG. 3C, a security platform includes a network gateway firewall (NGFW) entity 202 (e.g., a virtual/container implemented firewall solution, such as similarly described above) that is executed on a host 200 that also includes a Smart NIC 204. In an example implementation, the security platform is configured with an intelligent traffic offload service as similarly described above with respect to FIG. 3A.

Specifically, the disclosed techniques for selective intelligent traffic offload per Access Point Name (APN) and/or Data Network Name (DNN) for mobile networks using a security platform include applying selective intelligent traffic offload of network traffic by a security platform to a Smart NIC (e.g., NFGW 202 using Smart NIC 204 of host 200) and inspecting the remainder of the traffic (e.g., selected flows) using the security platform (e.g., NFGW 202). The security platform can be deployed in 5G/other mobile networks (e.g., such as shown in FIG. 1) and the selective intelligent offloading can be based on Access Point Name (APN) and/or Data Network Name (DNN) information extracted from monitored network traffic/flows (e.g., based on a policy for selective intelligent offloading based on Access Point Name (APN) and/or Data Network Name (DNN) configured for the security platform).

More specifically, the disclosed techniques for selective intelligent offloading based on Access Point Name (APN) and/or Data Network Name (DNN) for mobile networks using a security platform can be performed using two different techniques as will each now be described below.

As a first technique for selective intelligent offloading based on Access Point Name (APN) and/or Data Network Name (DNN) information for mobile networks using a security platform, the security platform receives a first number of packets for inspection (e.g., a first few packets for a new flow) as shown at 332 for an incoming flow 336. The security platform checks if an IP address(es) associated with the packets match an Access Point Name (APN) and/or a Data Network Name (DNN) configured in a policy (e.g., selective intelligent offloading (SITO) policy rules configured in the policy/security policy) as shown at 330. For an IP to APN/DNN match, the security platform refers to its APN/DNN to IP data store (e.g., implemented as a database, such as an SQL database, or another type of data store) maintained by NGFW 202. In this example implementation, the APN/DNN to IP mappings can be collected by the security platform using various techniques including inspection of Packet Forwarding Control Protocol (PFCP) messages, APIs, syslog messages, etc. If the APN/DNN to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 338. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 334.

As such, in this example implementation, the security platform only has to maintain the session table of flows including IPs mapped to APN/DNN information configured in the selective intelligent offloading (SITO) policy. In this example implementation, the security platform maintains the APN/DNN to the IP mapping data store of all the User Equipment devices (UEs) whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent offload policy, configured in the security platform. A second session table is maintained for the flows forwarded to the security platform for inspection.

As a second technique for selective intelligent offloading based on APN/DNN information for mobile networks using a security platform, the security platform receives a first number of packets for inspection (e.g., a first few packets for a new flow). The security platform checks if an IP address(es) associated with the packets match an APN and/or a DNN configured in a policy (e.g., selective intelligent offloading (SITO) policy rules configured in the policy/security policy). For an IP to APN/DNN match, the security platform refers to an APN/DNN to IP data store (e.g., implemented as a database, such as an SQL database, or another type of data store) maintained by Smart NIC 204 (e.g., implemented using a Smart NIC, DPU, UPF, or similar device). In this example implementation, the APN/DNN to IP mappings can be collected by Smart NIC 204 using various techniques including inspection of PFCP messages, APIs, syslog messages, etc. If the APN/DNN to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 338. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 334.

As such, in this example implementation, the security platform only has to maintain the session table of flows including IPs mapped to APN/DNN information configured in the selective intelligent offloading (SITO) policy. In this example implementation, in contrast to the above-described first technique, the Smart NIC 204 (e.g., implemented using a Smart NIC, DPU, UPF, or similar device) maintains the subscriber identity (e.g., IMSI and/or SUPI) and/or equipment identity (e.g., IMEI and/or PEI) to the IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent offloading policy, configured in the security platform. A second session table is maintained for the flows forwarded to the security platform for inspection.

As an example, the disclosed techniques for selective intelligent offloading for mobile networks per APN/DNN using a security platform can be performed to selectively offload traffic/flows for subscribers based on their APN/DNN used in the mobile network (e.g., 5G network) and to apply application control to the rest of the traffic/flows in the mobile network (e.g., 5G network).

As another example, the disclosed techniques for selective intelligent offloading for mobile networks per APN/DNN using a security platform can be performed to selectively offload traffic/flows of subscribers based on their APN/DNN used in the mobile network (e.g., 5G network) and to apply URL filtering to the rest of the traffic/flows in the mobile network (e.g., 5G network).

As yet another example, the disclosed techniques for selective intelligent offloading for mobile networks per APN/DNN using a security platform can be performed to selectively offload traffic/flows of subscribers based on their APN/DNN used in the mobile network (e.g., 5G network) and to apply known and unknown threat identification and prevention to the rest of the network traffic/flows.

As a further example, the disclosed techniques for selective intelligent offloading for mobile network APN/DNN using a security platform can be performed to deliver a selective intelligent offloading solution (e.g., including a security platform and devices/hosts including DPUs, Smart NICs, UPFs, etc.) in the mobile network (e.g., 5G network).

Example Use Cases for Selective Offloading Per Access Point Name and/or Data Network Name Using a Security Platform for Mobile Networks As a first example use case, mobile network service providers desire to offload traffic of subscribers connected to a certain APN, such as an Internet APN, such as similarly described above.

As a second example use case, mobile network service providers also desire the capability to offload traffic of certain selected subscribers (e.g., selected based on subscribers connected to a certain APN/DNN) that cannot be inspected due to privacy concerns and/or legal/regulatory/other requirements, such as similarly described above.

As will now be apparent to one of ordinary skill in the art, the disclosed techniques for selective offloading of traffic per Access Point Name (APN) and/or Data Network Name (DNN) for mobile networks using a security platform can be applied in a variety of additional example use case scenarios to detect/prevent these and other types of attacks for facilitating enhanced security for various deployments and environments in mobile networks.

Selective Offloading for Mobile Networks Per Location Using a Security Platform

Generally, there is a need to provide for selective offloading of traffic per location in mobile networks. Specifically, some customers desire the capability to offload traffic of certain selected subscribers based on their location and to not apply deep packet inspection (DPI) to such offloaded traffic (e.g., security inspection using DPI, such as for malware, threat detection, etc.), such as due to privacy concerns. As another example, mobile network service providers also desire the capability to offload traffic of certain selected subscribers based on their location that cannot be inspected due to legal/regulatory/other requirements (e.g., for subscribers located in a highly sensitive/secured government location, etc.).

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Accordingly, various techniques for providing selective offloading of traffic per location for mobile networks using a security platform are disclosed as will now be described with respect to FIG. 3D.

Figure 3D:
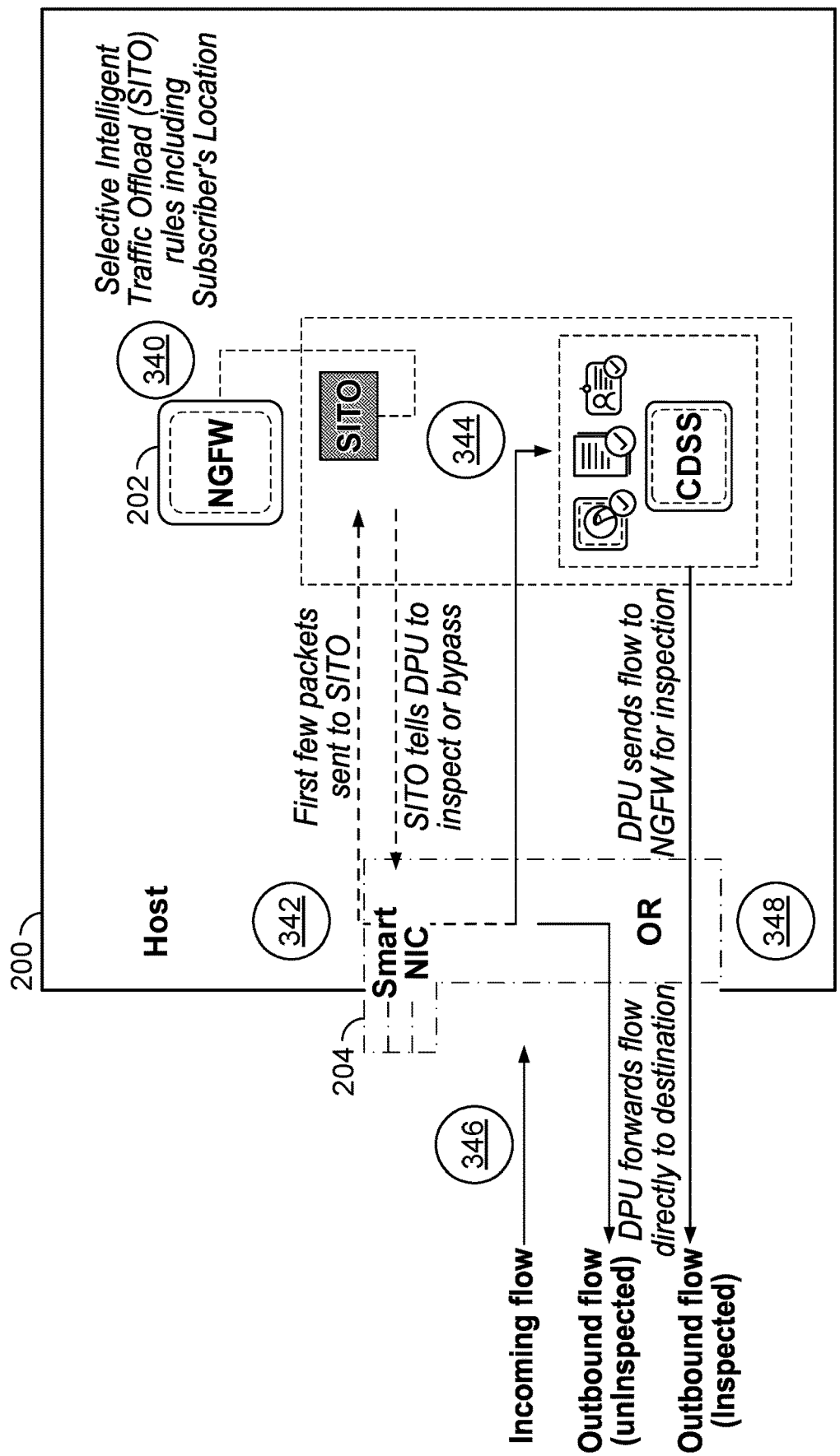
FIG. 3D illustrates selective intelligent enforcement per location for mobile networks using a security platform in accordance with some embodiments.

FIG. 3D illustrates selective intelligent enforcement per location for mobile networks using a security platform in accordance with some embodiments. Referring to FIG. 3D, a security platform includes a network gateway firewall (NGFW) entity 202 (e.g., a virtual/container implemented firewall solution, such as similarly described above) that is executed on a host 200 that also includes a Smart NIC 204. In an example implementation, the security platform is configured with an intelligent traffic offload service as similarly described above with respect to FIG. 3A.

Specifically, the disclosed techniques for selective intelligent traffic offload per location for mobile networks using a security platform include applying selective intelligent traffic offload of network traffic by a security platform to a Smart NIC (e.g., NFGW 202 using Smart NIC 204 of host 200) and inspecting the remainder of the traffic (e.g., selected flows) using the security platform (e.g., NFGW 202). The security platform can be deployed in 5G/other mobile networks (e.g., such as shown in FIG. 1) and the selective intelligent offloading can be based on location information extracted from monitored network traffic/flows (e.g., based on a policy for selective intelligent offloading based on location information configured for the security platform).

More specifically, the disclosed techniques for selective intelligent offloading based on location for mobile networks using a security platform can be performed using two different techniques as will each now be described below.

As a first technique for selective intelligent offloading based on a subscriber's location information for mobile networks using a security platform, the security platform receives a first number of packets for inspection (e.g., a first few packets for a new flow) as shown at 342 for an incoming flow 346. The security platform checks if an IP address(es) associated with the packets match a location configured in a policy (e.g., selective intelligent offloading (SITO) policy rules configured in the policy/security policy) as shown at 340. For an IP to location match, the security platform refers to its location to IP data store (e.g., implemented as a database, such as an SQL database, or another type of data store) maintained by NGFW 202. In this example implementation, the location to IP mappings can be collected by the security platform using various techniques including inspection of Packet Forwarding Control Protocol (PFCP) messages, APIs, syslog messages, etc. If the location to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 348. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 344.

As such, in this example implementation, the security platform only has to maintain the session table of flows including IPs mapped to location information configured in the selective intelligent offloading (SITO) policy. In this example implementation, the security platform maintains the location to the IP mapping data store of all the User Equipment devices (UEs) whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent offload policy, configured in the security platform. A second session table is maintained for the flows forwarded to the security platform for inspection.

As a second technique for selective intelligent offloading based on location information for mobile networks using a security platform, the security platform receives a first number of packets for inspection (e.g., a first few packets for a new flow). The security platform checks if an IP address(es) associated with the packets match a location configured in a policy (e.g., selective intelligent offloading (SITO) policy rules configured in the policy/security policy). For an IP to location match, the security platform refers to a location to IP data store (e.g., implemented as a database, such as an SQL database, or another type of data store) maintained by Smart NIC 204 (e.g., implemented using a Smart NIC, DPU, UPF, or similar device). In this example implementation, the location to IP mappings can be collected by Smart NIC 204 using various techniques including inspection of PFCP messages, APIs, syslog messages, etc. If the location to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 348. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 344.

As such, in this example implementation, the security platform only has to maintain the session table of flows including IPs mapped to location information configured in the selective intelligent offloading (SITO) policy. In this example implementation, in contrast to the above-described first technique, the Smart NIC 204 (e.g., implemented using a Smart NIC, DPU, UPF, or similar device) maintains the location to the IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent offloading policy, configured in the security platform. A second session table is maintained for the flows forwarded to the security platform for inspection.

As an example, the disclosed techniques for selective intelligent offloading for mobile networks per location using a security platform can be performed to selectively offload traffic/flows for subscribers based on their location and to apply application control to the rest of the traffic/flows in the mobile network (e.g., 5G network).

As another example, the disclosed techniques for selective intelligent offloading for mobile networks per location using a security platform can be performed to selectively offload traffic/flows of subscribers based on their location and to apply URL filtering to the rest of the traffic/flows in the mobile network (e.g., 5G network).

As yet another example, the disclosed techniques for selective intelligent offloading for mobile networks per location using a security platform can be performed to selectively offload traffic/flows of subscribers based on their location and to apply known and unknown threat identification and prevention to the rest of the network traffic/flows.

As a further example, the disclosed techniques for selective intelligent offloading for mobile networks per location using a security platform can be performed to deliver a selective intelligent offloading solution (e.g., including a security platform and devices/hosts including DPUs, Smart NICs, UPFs, etc.) in the mobile network (e.g., 5G network).

Example Use Cases for Selective Offloading Per Location Using a Security Platform for Mobile Networks As a first example use case, mobile network service providers and/or their enterprise customers desire to offload traffic of subscribers associated with a certain location, such as similarly described above. For instance, the disclosed techniques can be applied to offload traffic of all subscribers connected to a mobile network in a government building. An example location type in this example use case can be specified as in 5G as one or more of the following: (1) Location Area Code (LAC); (2) Cell Identity (CI) (e.g., CI generally refers to an area of several hundred meters within a given base station); (3) Zone ID (e.g., the identity of the zone, see ETSI GS MEC 013 V3.1.1, which is publicly available at https://www.etsi.org/deliver/etsi_gs/MEC/001_099/013/03.01.01_60/gs_MEC013v030101p.pdf) and (4) Access Point ID (e.g., the identity of the access point that the user/subscriber is currently located within, see ETSI GS MEC 013 V3.1.1).

As a second example use case, mobile network service providers and/or their enterprise customers desire to offload traffic of all users/subscribers within a zone connected to Multi-access Edge Computing (MEC). An example location type in this example use case can be specified as in 5G as one or more of the following: (1) Zone ID (e.g., the identity of the zone, see ETSI GS MEC 013 V3.1.1); and (2) Access Point ID (e.g., the identity of the access point that the user/subscriber is currently located within, see ETSI GS MEC 013 V3.1.1).

As will now be apparent to one of ordinary skill in the art, the disclosed techniques for selective offloading of traffic per location for mobile networks using a security platform can be applied in a variety of additional example use case scenarios to detect/prevent these and other types of attacks for facilitating enhanced security for various deployments and environments in mobile networks.

Selective Offloading for Mobile Networks Per Radio Access Technology Using a Security Platform Generally, there is a need to provide for selective offloading of traffic per Radio Access Technology (RAT) (e.g., per RAT type) in mobile networks. Specifically, customers desire the capability to offload traffic of certain selected subscribers based on their RAT type (e.g., subscribers connected to a trusted wireless LAN) and to not apply deep packet inspection (DPI) to such offloaded traffic (e.g., security inspection using DPI, such as for malware, threat detection, etc.), and to inspect the rest of the traffic associated with other subscribers (e.g., subscribers not connected to the trusted wireless LAN). As another example, mobile network service providers also desire the capability to offload traffic of certain selected subscribers based on their RAT type (e.g., subscribers connected to certain access technologies, as the service providers may see de minimis value in security inspection for such traffic or for other reasons).

Moreover, due to the ever increasing network traffic passing through mobile networks of such mobile network service providers, there is a need for network security analysis/solutions to be more cost effective and to selectively inspect traffic to improve effectiveness and efficiency as will be further described below.

Examples of Radio Access Technologies in mobile networks include the following (e.g., as specified in 3GPP TS 29.571, which is publicly available at https://www.etsi.org/deliver/etsi_ts/129500_129599/129571/16.06.00_60/ts_129571v160600p.p df): New Radio (NR) access type, WLAN (e.g., untrusted Wireless LAN (IEEE 802.11) access type, Wireline Cable access type, and New Radio Low Earth Orbit (NR LEO) satellite access type.

Accordingly, various techniques for providing selective offloading of traffic per RAT type for mobile networks using a security platform are disclosed as will now be described with respect to FIG. 3E.

Figure 3E:
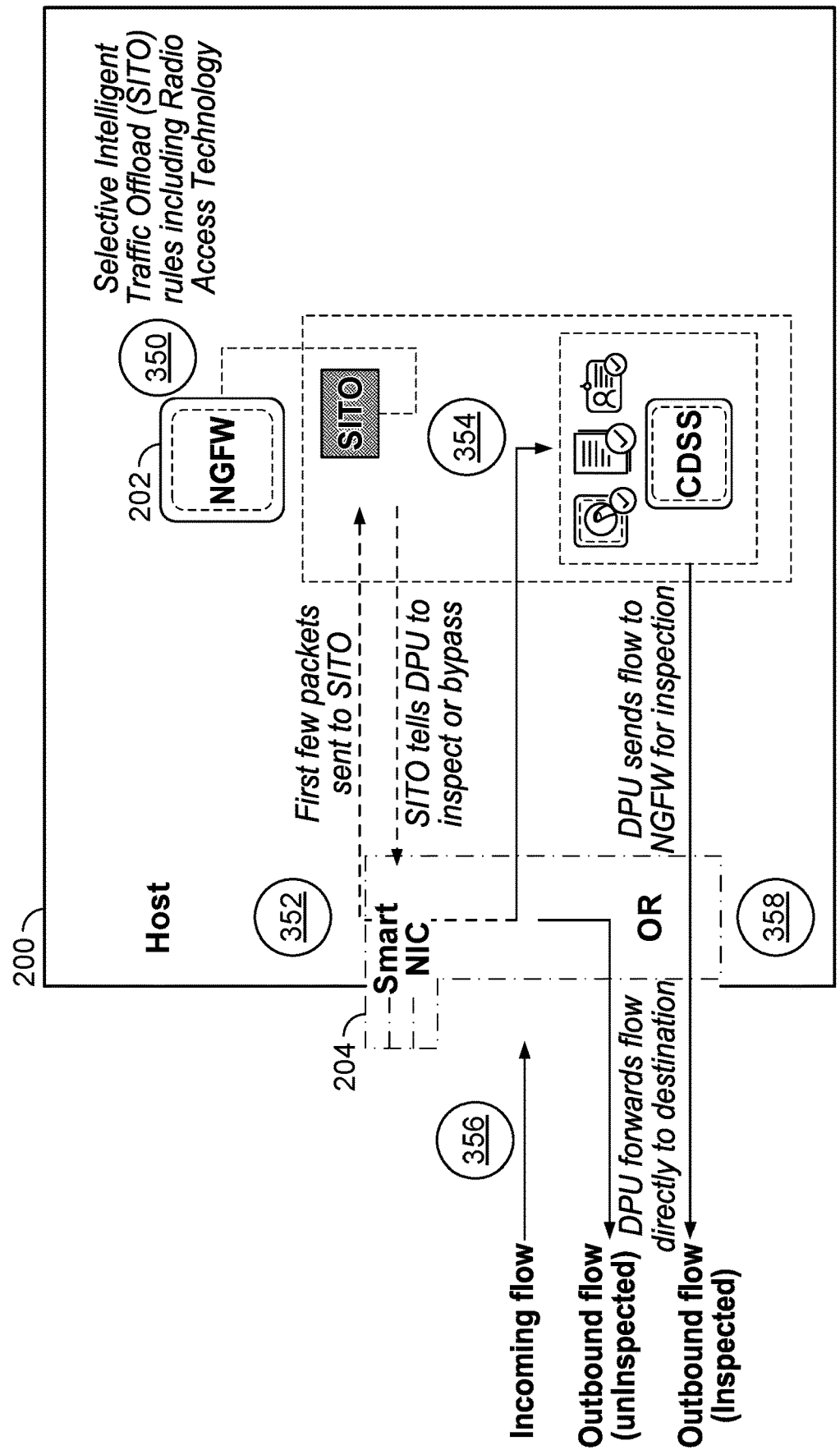
FIG. 3E illustrates selective intelligent enforcement per Radio Access Technology for mobile networks using a security platform in accordance with some embodiments.

FIG. 3E illustrates selective intelligent enforcement per Radio Access Technology for mobile networks using a security platform in accordance with some embodiments. Referring to FIG. 3E, a security platform includes a network gateway firewall (NGFW) entity 202 (e.g., a virtual/container implemented firewall solution, such as similarly described above) that is executed on a host 200 that also includes a Smart NIC 204. In an example implementation, the security platform is configured with an intelligent traffic offload service as similarly described above with respect to FIG. 3A.

Specifically, the disclosed techniques for selective intelligent traffic offload per Radio Access Technology (RAT) (e.g., RAT type) for mobile networks using a security platform include applying selective intelligent traffic offload of network traffic by a security platform to a Smart NIC (e.g., NFGW 202 using Smart NIC 204 of host 200) and inspecting the remainder of the traffic (e.g., selected flows) using the security platform (e.g., NFGW 202). The security platform can be deployed in 5G/other mobile networks (e.g., such as shown in FIG. 1) and the selective intelligent offloading can be based on RAT type information extracted from monitored network traffic/flows (e.g., based on a policy for selective intelligent offloading based on RAT type information configured for the security platform).

More specifically, the disclosed techniques for selective intelligent offloading based on RAT type for mobile networks using a security platform can be performed using two different techniques as will each now be described below.

As a first technique for selective intelligent offloading based on a subscriber's RAT type information for mobile networks using a security platform, the security platform receives a first number of packets for inspection (e.g., a first few packets for a new flow) as shown at 352 for an incoming flow 356. The security platform checks if an IP address(es) associated with the packets match a location configured in a policy (e.g., selective intelligent offloading (SITO) policy rules configured in the policy/security policy) as shown at 350. For an IP to RAT type match, the security platform refers to its RAT type to IP data store (e.g., implemented as a database, such as an SQL database, or another type of data store) maintained by NGFW 202. In this example implementation, the RAT type to IP mappings can be collected by the security platform using various techniques including inspection of Packet Forwarding Control Protocol (PFCP) messages, APIs, syslog messages, etc. If the RAT type to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 358. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 354.

As such, in this example implementation, the security platform only has to maintain the session table of flows including IPs mapped to RAT type information configured in the selective intelligent offloading (SITO) policy. In this example implementation, the security platform maintains the RAT type to the IP mapping data store of all the User Equipment devices (UEs) whose information is extracted (e.g., from the PFCP messages, syslog messages, or received via APIs). Smart NIC 204 (e.g., implemented using a Smart NIC, DPU, UPF, or similar device) maintains two session tables and refers to them to make forwarding decisions for ongoing traffic. A first session table is maintained for flows of IPs matching the selective intelligent offload policy, configured in the security platform. A second session table is maintained for the flows forwarded to the security platform for inspection.

As a second technique for selective intelligent offloading based on RAT type information for mobile networks using a security platform, the security platform receives a first number of packets for inspection (e.g., a first few packets for a new flow). The security platform checks if an IP address(es) associated with the packets match a RAT type configured in a policy (e.g., selective intelligent offloading (SITO) policy rules configured in the policy/security policy). For an IP to RAT type match, the security platform refers to a RAT type to IP data store (e.g., implemented as a database, such as an SQL database, or another type of data store) maintained by Smart NIC 204 (e.g., implemented using a Smart NIC, DPU, UPF, or similar device). In this example implementation, the RAT type to IP mappings can be collected by Smart NIC 204 using various techniques including inspection of PFCP messages, APIs, syslog messages, etc. If the RAT type to IP mappings match a selective intelligent offloading (SITO) policy rule, then the security platform will instruct the Smart NIC (e.g., Smart NIC 204 implemented using a Smart NIC, DPU, UPF, or similar device) or similar device to offload this session (i.e., bypass security inspection), and the Smart NIC forwards the flow directly to its destination as shown at 358. If there is no match, then the security platform initiates/sets up a new session for this flow and instructs the Smart NIC (e.g., Smart NIC 204 implemented using a Smart NIC, DPU, UPF, or similar device) to send the traffic associated with this flow to the security platform (e.g., NGFW 202) to apply security (e.g., L7 security) as shown at 354.

As such, in this example implementation, the security platform only has to maintain the session table of flows including IPs mapped to RAT type information configured in the selective intelligent offloading (SITO) policy. In this example implementation, in contrast to the above-described first technique, the Smart NIC 204 (e.g., implemented using a Smart NIC, DPU, UPF, or similar device) maintains the RAT type to the IP mapping data store of all the User Equipment devices (UEs) whose information is extracted from the PFCP and syslog messages or received in APIs. As similarly described above with respect to the first technique, Smart NIC 204 (e.g., implemented using a Smart NIC, DPU, UPF, or similar device) also maintains two session tables and refers to them to make forwarding decisions for ongoing traffic. A first session table is maintained for flows of IPs matching the selective intelligent offloading policy, configured in the security platform. A second session table is maintained for the flows forwarded to the security platform for inspection.

As an example, the disclosed techniques for selective intelligent offloading for mobile networks per RAT using a security platform can be performed to selectively offload traffic/flows for subscribers based on their RAT type and to apply application control to the rest of the traffic/flows in the mobile network (e.g., 5G network).

As another example, the disclosed techniques for selective intelligent offloading for mobile networks per RAT using a security platform can be performed to selectively offload traffic/flows of subscribers based on their RAT type and to apply URL filtering to the rest of the traffic/flows in the mobile network (e.g., 5G network).

As yet another example, the disclosed techniques for selective intelligent offloading for mobile networks per RAT using a security platform can be performed to selectively offload traffic/flows of subscribers based on their RAT type and to apply known and unknown threat identification and prevention to the rest of the network traffic/flows.

As a further example, the disclosed techniques for selective intelligent offloading for mobile networks per RAT using a security platform can be performed to deliver a selective intelligent offloading solution (e.g., including a security platform and devices/hosts including DPUs, Smart NICs, UPFs, etc.) in the mobile network (e.g., 5G network).

Example Use Cases for Selective Offloading Per Radio Access Technology Using a Security Platform for Mobile Networks As a first example use case, mobile network service providers and/or their enterprise customers desire to offload traffic of subscribers associated with a certain RAT type, such as for all subscribers connected via satellite access to a mobile network, such as similarly described above. Examples of such satellite access can be specified via RAT in 5G networks, including the following types of satellite access: (1) NR_LEO satellite access type; (2) NR_MEO satellite access type; (3) NR_GEO satellite access type; and/or (4) NR_OTHER_SAT satellite access type.

As a second example use case, mobile network service providers and/or their enterprise customers desire to offload traffic of subscribers associated with a certain RAT type, such as for all subscribers connected via trusted wireless access to a mobile network and to inspect traffic for all subscribers connected via untrusted wireless access to a mobile network (e.g., subscribers connected via guest wireless access to the mobile network), such as similarly described above. Examples of such wireless access can be specified via RAT in 5G networks, including the following types of wireless access: (1) WLAN-Untrusted Wireless LAN (IEEE 802.11) access; and/or (2) TRUSTED_WLAN-Trusted Wireless LAN (IEEE 802.11) access.

As will now be apparent to one of ordinary skill in the art, the disclosed techniques for selective offloading of traffic per RAT type for mobile networks using a security platform can be applied in a variety of additional example use case scenarios to detect/prevent these and other types of attacks for facilitating enhanced security for various deployments and environments in mobile networks.

As will now be apparent to one of ordinary skill in the art, the disclosed techniques for selective offloading of traffic for mobile networks using a security platform can be applied in a variety of additional example use case scenarios to detect/prevent these and other types of attacks for facilitating enhanced security for various deployments and environments in mobile networks.

Figure 4:
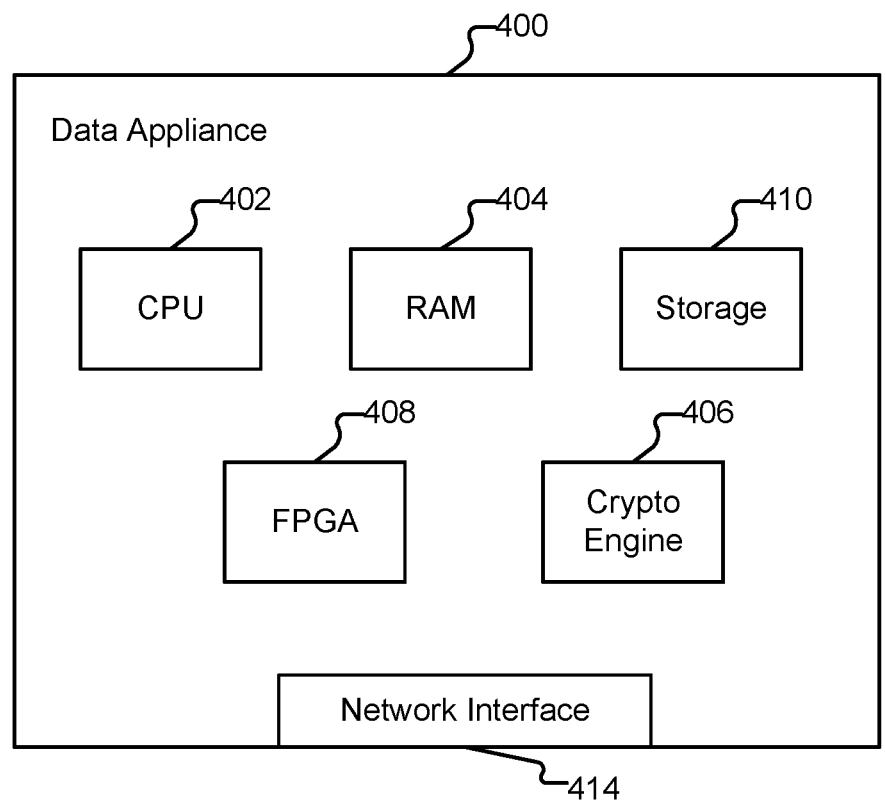
FIG. 4 is a functional diagram of hardware components of a network device for selective intelligent enforcement and/or selective offloading in mobile networks in accordance with some embodiments.

Example Hardware Components of a Network Device for Selective Intelligent Enforcement and/or Selective Offloading in Mobile Networks FIG. 4 is a functional diagram of hardware components of a network device for selective intelligent enforcement and/or selective offloading in mobile networks in accordance with some embodiments. The example shown is a representation of physical/hardware components that can be included in network device 400 (e.g., an appliance, gateway, or server that can implement the security platform disclosed herein). Specifically, network device 400 includes a high performance multi-core CPU 402 and RAM 404. Network device 300 also includes a storage 410 (e.g., one or more hard disks or solid state storage units), which can be used to store policy and other configuration information as well as signatures. In one embodiment, storage 410 stores certain information (e.g., network slice information, subscriber identity (ID) information, equipment identity (ID), APN/DNN, location information, RAT type, and/or other parameters/information extracted from interfaces (e.g., SGi, N3, N4, N6, and/or other interfaces), parsed network traffic (e.g., GTP-U, HTTP/2, and/or other network protocols), and/or syslog messages) for implementing the disclosed security policy enforcement techniques for applying enhanced security for mobile networks including the disclosed techniques for applying selective intelligent enforcement and/or selective offloading per network slice, subscriber-ID, equipment-ID, APN/DNN, location, RAT, and/or combinations thereof, in mobile networks using a security platform(s) as described herein.

In addition, network device 400 includes a Network Interface as shown at 414. The network interface element shown at 414 can include one or more of the following: (1) a Network Interface Card (NIC); (2) a SmartNIC; (3) a Data Processing Unit (DPU); (4) an Infrastructure Processing Unit (IPU); and/or (5) a SmartFabric. As an example implementation, a commercially available Smart NIC can be used, such as the NVIDIA BlueField-3 DPU (e.g., and/or other commercially available network interfaces as described above can similarly be used) for implementing the disclosed techniques for selective intelligent enforcement and/or selective offloading in mobile networks, such as similarly described above with respect to FIGS. 2A and 3A. In one embodiment, Smart NIC 414 stores certain information (e.g., network slice information, subscriber identity (ID) information, equipment identity (ID), APN/DNN, location information, RAT type, and/or other parameters/information extracted from interfaces (e.g., SGi, N3, N4, N6, and/or other interfaces), parsed network traffic (e.g., GTP-U, HTTP/2, and/or other network protocols), and/or syslog messages) for implementing the disclosed security policy enforcement techniques for applying enhanced security for mobile networks including the disclosed techniques for applying selective intelligent enforcement and/or selective offloading per network slice, subscriber-ID, equipment-ID, APN/DNN, location, RAT, and/or combinations thereof, in mobile networks using a security platform(s) as described herein.

Network device 400 can also include one or more optional hardware accelerators. For example, network device 400 can include a cryptographic engine 406 configured to perform encryption and decryption operations, and one or more FPGAs 408 configured to perform signature matching, act as network processors, and/or perform other tasks.

As will now be apparent to one of ordinary skill in the art, the disclosed techniques for selective intelligent enforcement and/or selective offloading in mobile networks can be implemented using various hardware components of a network device that include a Smart NIC, DPU, and/or other components with similar capabilities for facilitating enhanced security for performing the disclosed techniques in mobile networks.

Figure 5:
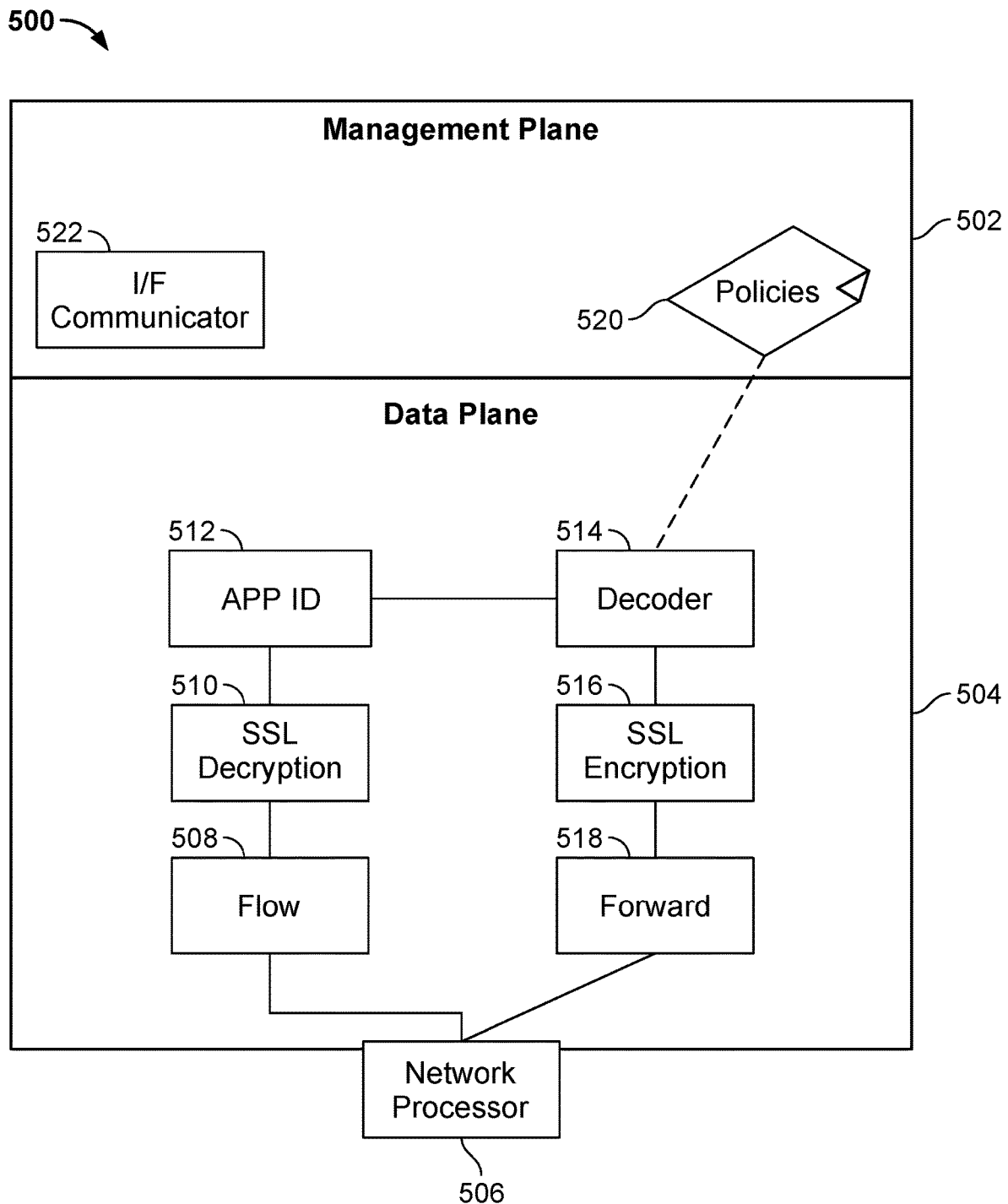
FIG. 5 is a functional diagram of logical components of a network device for selective intelligent enforcement and/or selective offloading in mobile networks in accordance with some embodiments.

Example Logical Components of a Network Device for Selective Intelligent Enforcement and/or Selective Offloading in Mobile Networks FIG. 5 is a functional diagram of logical components of a network device for selective intelligent enforcement and/or selective offloading in mobile networks in accordance with some embodiments. The example shown is a representation of logical components that can be included in network device 500 (e.g., a data appliance, which can implement the disclosed security function/platform and perform the disclosed techniques for selective intelligent enforcement and/or selective offloading in mobile networks). As shown, network device 400 includes a management plane 502 and a data plane 504. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, an MEC service, an IoT device, or another resource) using an encrypted session protocol, such as SSL. Network processor 506 (e.g., the network processor can include an implementation of Smart NIC 414 as shown in FIG. 4 and as described above with respect to FIG. 4) is configured to monitor packets from the mobile device and provide the packets to data plane 504 for processing. Flow 508 identifies the packets as being part of a new session and creates a new session flow. Subsequent packets will be identified as belonging to the session based on a flow lookup. If applicable, SSL decryption is applied by SSL decryption engine 510 using various techniques as described herein. Otherwise, processing by SSL decryption engine 510 is omitted. Application identification (APP ID) module 512 is configured to determine what type of traffic the session involves (e.g., IP traffic and/or other network protocols of traffic, such as GTP-U traffic, between various monitored interfaces as similarly described above with respect to FIG. 1) and to identify a user associated with the traffic flow (e.g., to identify a user-ID and an application-ID (APP-ID) as described herein). For example, APP ID 512 can recognize a GET request in the received data and conclude that the session requires an HTTP decoder 514. As another example, APP ID 512 can recognize GTP-U session messages carrying encapsulated IP traffic from UEs (e.g., over various interfaces, such as similarly described above with respect to FIG. 1) and conclude that the session requires a GTP-U decoder (e.g., to extract information exchanged in the GTP-U traffic session over various interfaces including various parameters, such as similarly described above with respect to FIG. 1). For each type of protocol, there exists a corresponding decoder 514. In one embodiment, the application identification is performed by an application identification module (e.g., APP ID component/engine), and a user identification is performed by another component/engine. Based on the determination made by APP ID 512, the packets are sent to an appropriate decoder 514. Decoder 514 is configured to assemble packets (e.g., which may be received out of order) into the correct order, perform tokenization, and extract out information (e.g., such to extract various information exchanged in GTP-U traffic over various interfaces as similarly described above and further described below). Decoder 514 also performs signature matching to determine what should happen to the packet. SSL encryption engine 516 performs SSL encryption using various techniques as described herein and the packets are then forwarded using a forward component 518 as shown. As also shown, policies 520 are received and stored in the management plane 502. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-U/IP traffic and/or DPI of monitored GTP-U/IP and/or other protocol(s) traffic, such as N3/N4/N6/other interfaces as similarly described above with respect to FIG. 1) is applied as described herein with respect to various embodiments based on the monitored, decrypted, identified, and decoded session traffic flows.

As also shown in FIG. 5, an interface (I/F) communicator 522 is also provided for security platform manager communications. In some cases, network communications of other network elements on the service provider network are monitored using network device 500, and data plane 504 supports decoding of such communications (e.g., network device 500, including I/F communicator 522 and decoder 514, can be configured to monitor and/or communicate on, for example, reference point interfaces such as SGi, N3, N4, N6, and/or other interfaces where wired and wireless network traffic flow exists). As such, network device 500 including I/F communicator 522 can be used to implement the disclosed techniques for applying selective intelligent enforcement and/or selective offloading in mobile networks as described above and as will be further described below.

Additional example processes for the disclosed techniques for selective intelligent enforcement and/or selective offloading in mobile networks will now be described.

Figure 6:
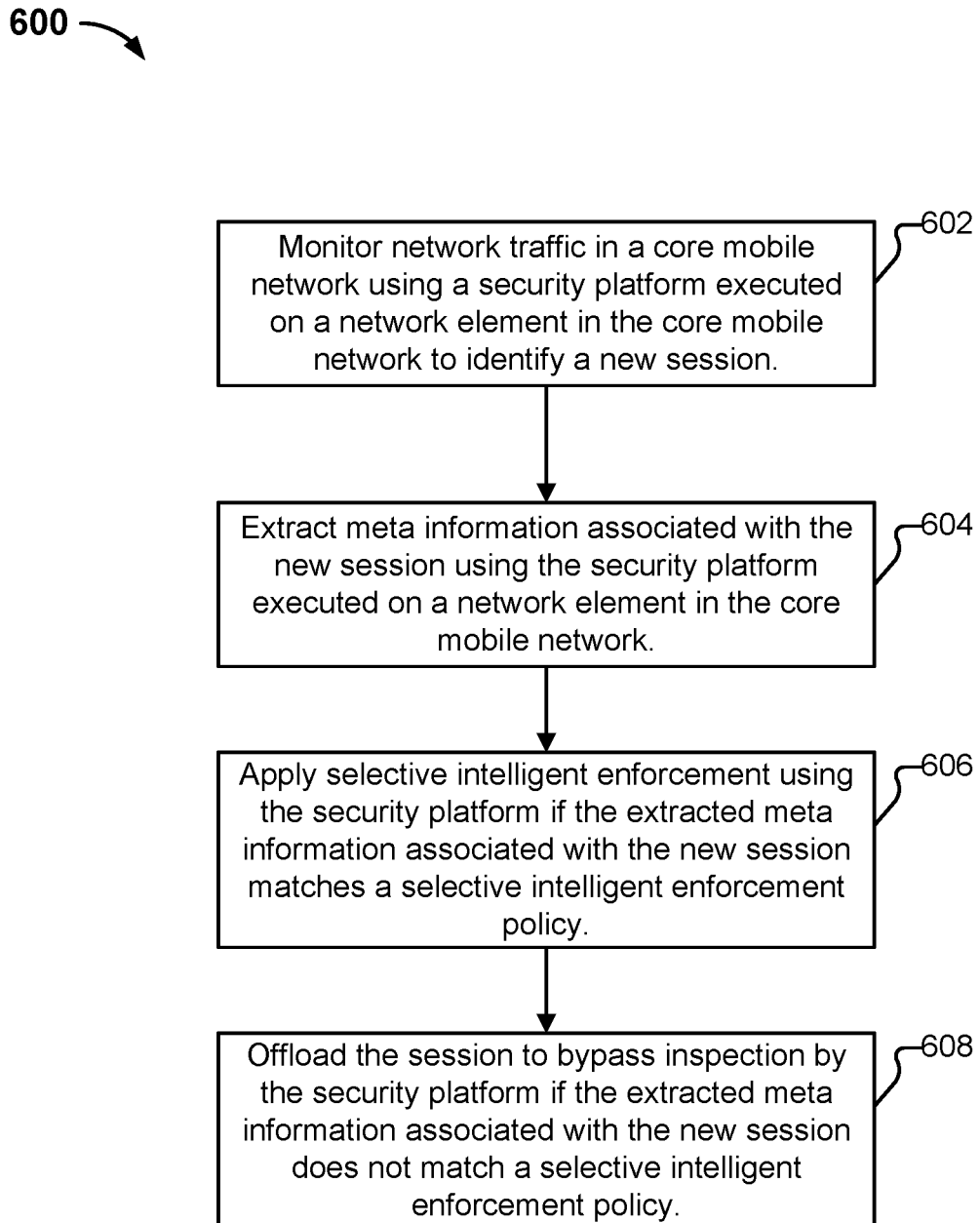
FIG. 6 is a flow diagram of a process for selective intelligent enforcement for mobile networks using a security platform in accordance with some embodiments.

Example Processes for Selective Intelligent Enforcement in Mobile Networks Using a Security Platform FIG. 6 is a flow diagram of a process for selective intelligent enforcement for mobile networks using a security platform in accordance with some embodiments. In some embodiments, a process 600 as shown in FIG. 6 is performed by the security platform and techniques as similarly described above including the embodiments described above with respect to FIGS. 1-5. In one embodiment, process 600 is performed by data appliance 400 as described above with respect to FIG. 4, network device 500 as described above with respect to FIG. 5, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, monitoring network traffic in a core mobile network using a security platform executed on a network element in the core mobile network to identify a new session that attached to the core mobile network for mobile network communications is performed. For example, a security platform executed on a network element in the core mobile network can be implemented using a virtual and/or container-based firewall, such as similarly described above.

At 604, extracting meta information associated with the new session using the security platform executed on the network element in the core mobile network is performed. For example, the meta information associated with the new session can be extracted using the security platform executed on the network element in the core mobile network by performing inspection of packet forwarding control protocol (PFCP) messages, application programming interfaces (APIs), and/or syslog messages such as similarly described above with respect to FIGS. 1-2E.

At 606, applying selective intelligent enforcement using the security platform if the extracted meta information associated with the session matches a selective intelligent enforcement policy is performed. For example, the selective intelligent enforcement (SIE) policy can include one or more rules to apply network slice based security, subscriber identity based security, equipment identity based security, access point name (APN) based security, data network name (DNN) based security, location based security, and/or radio access technology based security in the core mobile network, such as similarly described above with respect to FIGS. 1-2E.

At 608, offloading the session to bypass inspection by the security platform if the extracted meta information associated with the new session does not match the selective intelligent enforcement policy is performed. For example, the session can be offloaded to a smart network interface card of the network element.

Figure 7:
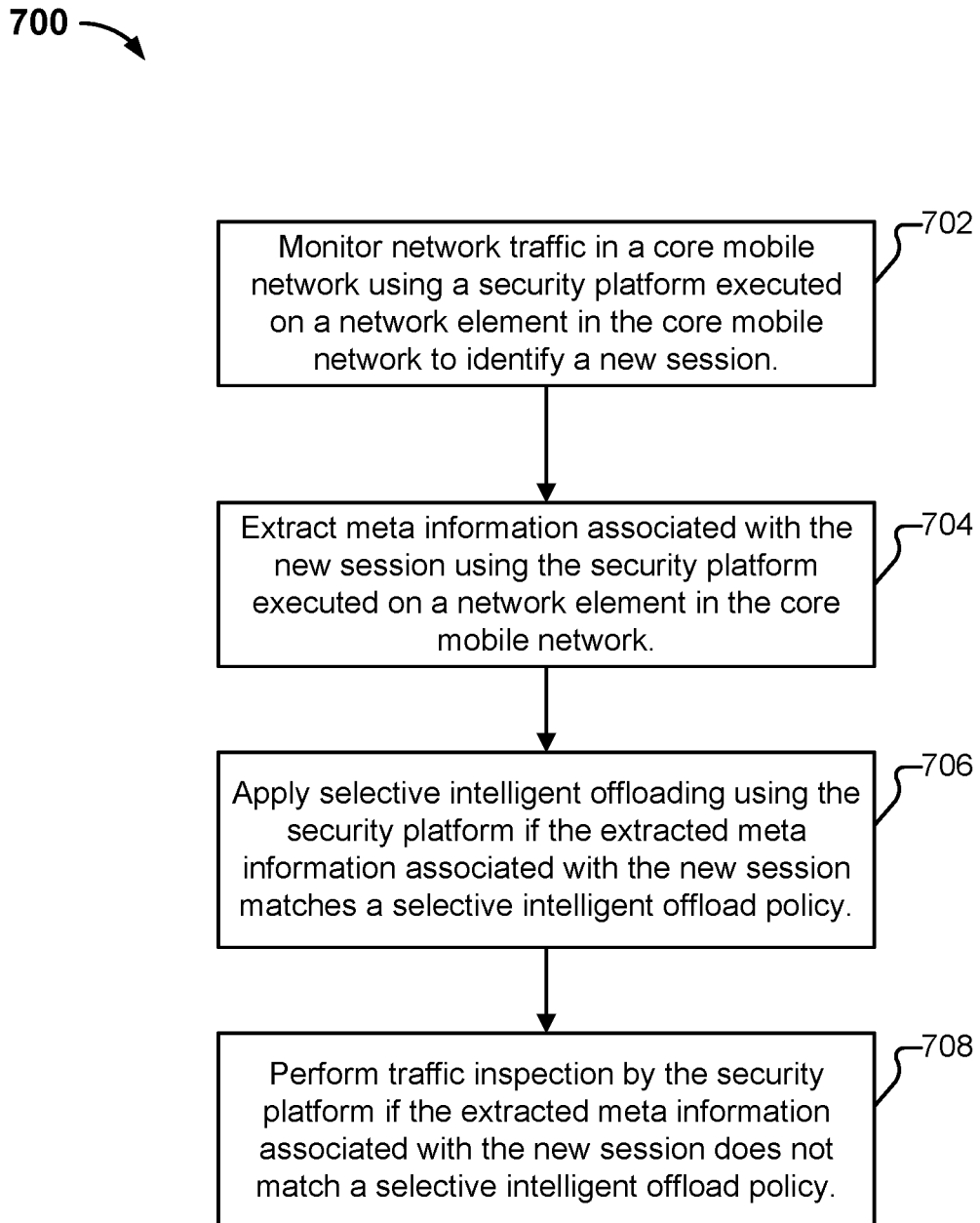
FIG. 7 is a flow diagram of a process for selective intelligent offloading for mobile networks using a security platform in accordance with some embodiments.

Example Processes for Selective Offloading in Mobile Networks Using a Security Platform FIG. 7 is a flow diagram of a process for selective intelligent offloading for mobile networks using a security platform in accordance with some embodiments. In some embodiments, a process 700 as shown in FIG. 7 is performed by the security platform and techniques as similarly described above including the embodiments described above with respect to FIGS. 1-5. In one embodiment, process 700 is performed by data appliance 400 as described above with respect to FIG. 4, network device 500 as described above with respect to FIG. 5, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 702, monitoring network traffic in a core mobile network using a security platform executed on a network element in the core mobile network to identify a new session that attached to the core mobile network for mobile network communications is performed. For example, security platform executed on a network element in the core mobile network can be implemented using a virtual and/or container-based firewall, such as similarly described above.

At 704, extracting meta information associated with the new session using the security platform executed on the network element in the core mobile network is performed. For example, the meta information associated with the new session can be extracted using the security platform executed on the network element in the core mobile network by performing inspection of packet forwarding control protocol (PFCP) messages, application programming interfaces (APIs), and/or syslog messages such as similarly described above with respect to FIGS. 1 and 3A-3E.

At 706, applying selective intelligent enforcement using the security platform if the extracted meta information associated with the session matches a selective intelligent offload policy is performed. For example, the selective intelligent enforcement (SIE) policy can include one or more rules to apply network slice based security, subscriber identity based security, equipment identity based security, access point name (APN) based security, data network name (DNN) based security, location based security, and/or radio access technology based security in the core mobile network, such as similarly described above with respect to FIGS. 1 and 3A-3E.

At 708, traffic inspection is performed by the security platform if the extracted meta information associated with the new session does not match a selective intelligent offload policy. For example, the session traffic inspection can be performed by that security platform executed on a network element in the core mobile network, which can be implemented using a virtual and/or container-based firewall, such as similarly described above.

Figure 8:
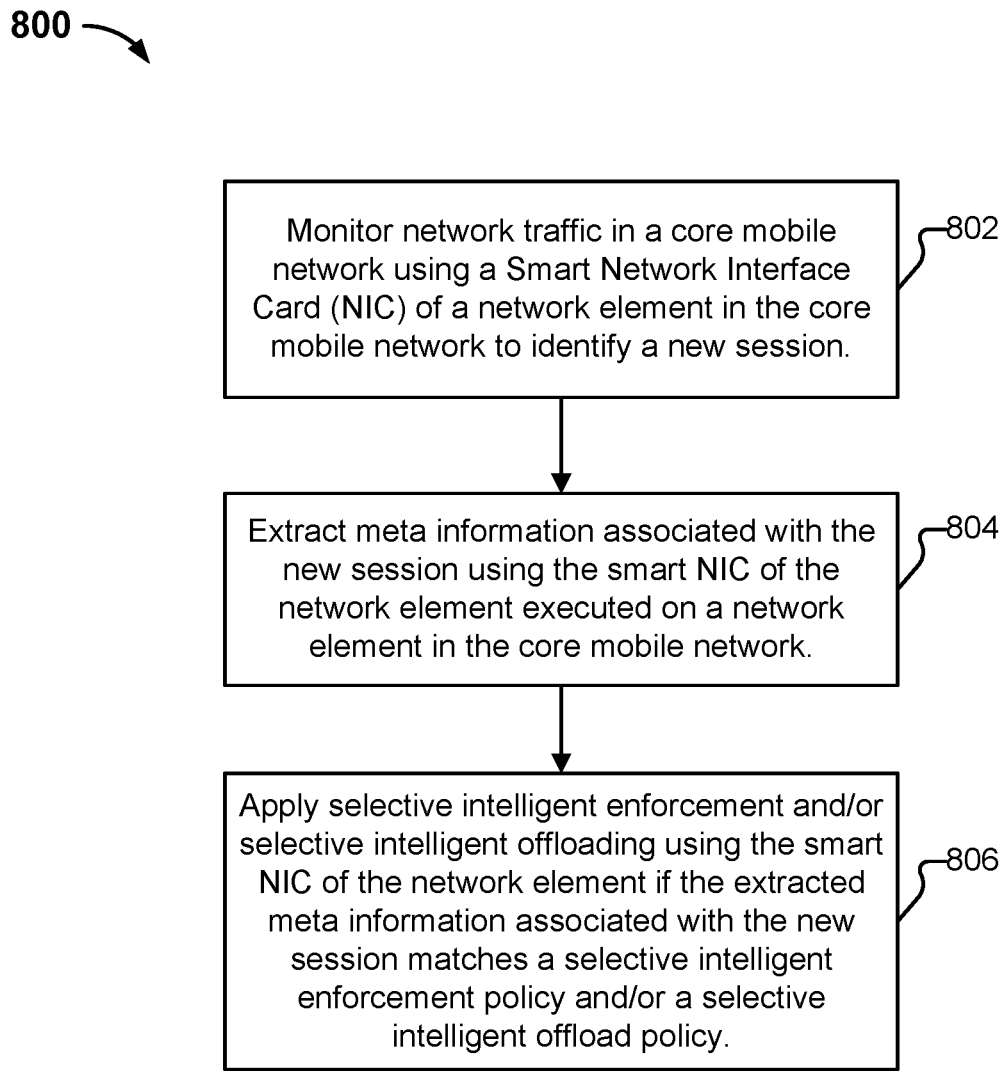
FIG. 8 is a flow diagram of a process for selective intelligent enforcement and/or selective offloading in mobile networks using a Smart NIC in accordance with some embodiments.

Example Processes for Selective Intelligent Enforcement and/or Selective Offloading in Mobile Networks Using a Smart NIC FIG. 8 is a flow diagram of a process for selective intelligent enforcement and/or selective offloading in mobile networks using a Smart NIC in accordance with some embodiments. In some embodiments, a process 800 as shown in FIG. 8 is performed by the security platform and techniques as similarly described above including the embodiments described above with respect to FIGS. 1-5. In one embodiment, process 800 is performed by data appliance 400 as described above with respect to FIG. 4, network device 500 as described above with respect to FIG. 5, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 802, monitoring network traffic in a core mobile network using a Smart Network Interface Card (NIC) of a network element in the core mobile network to identify a new session that attached to the core mobile network for mobile network communications is performed. For example, smart NIC can include a data processing unit (DPU), such as similarly described above.

At 804, meta information associated with the new session using the Smart NIC of the network element in the core mobile network is performed. For example, the meta information associated with the new session can be extracted using the smart NIC of the network element in the core mobile network by performing inspection of packet forwarding control protocol (PFCP) messages, application programming interfaces (APIs), and/or syslog messages such as similarly described above with respect to FIGS. 1-3E.

At 806, applying selective intelligent enforcement and/or selective intelligent offloading is performed using the Smart NIC of the network element if the extracted meta information associated with the new session matches a selective intelligent enforcement policy and/or a selective intelligent offload policy. For example, the selective intelligent enforcement (SIE) policy and/or selective intelligent offloading (SITO) policy can include one or more rules to apply network slice based security, subscriber identity based security, equipment identity based security, access point name (APN) based security, data network name (DNN) based security, location based security, and/or radio access technology based security in the core mobile network, such as similarly described above with respect to FIGS. 1-3E.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor network traffic in a core mobile network using a security platform executed on a network element in the core mobile network to identify a new session that attached to the core mobile network for mobile network communications;
extract meta information associated with the new session using the security platform executed on the network element in the core mobile network;
apply selective intelligent enforcement for mobile networks based on the extracted meta information using the security platform if the extracted meta information associated with the new session matches a selective intelligent enforcement policy; policy, wherein the extracted meta information includes radio access technology (RAT) information, wherein the applying of the selective intelligent enforcement for mobile networks comprises to:
check that an IP address associated with the monitored network traffic matches a RAT type configured in a policy; and
in response to a determination that the IP address matches the RAT type policy, refer the RAT information to an IP data store of the security platform; and
offload the new session to bypass security inspection by the security platform if the extracted meta information associated with the new session does not match the selective intelligent enforcement policy, wherein the network traffic associated with the new session that does not match the selective intelligent enforcement policy bypasses the security platform and layer 7 security is not applied to the network traffic associated with the new session to improve security analysis performance at the security platform; and
a memory coupled to the processor and configured to provide the processor with instructions.

2. The system recited in claim 1, wherein the security platform is executed on a host entity in the core mobile network.

3. The system recited in claim 1, wherein the security platform is a virtual firewall executed on a host entity in the core mobile network.

4. The system recited in claim 1, wherein the offloading of the new session to bypass the inspection by the security platform if the extracted meta information associated with the new session does not match the selective intelligent enforcement policy is performed by offloading the new session to a smart network interface card of the network element.

5. The system recited in claim 1, wherein the offloading of the new session to bypass the inspection by the security platform if the extracted meta information associated with the new session does not match the selective intelligent enforcement policy is performed by offloading the new session to a smart network interface card (NIC) of the network element, and wherein the smart NIC includes a data processing unit.

6. The system recited in claim 1, wherein the meta information includes network slice information.

7. The system recited in claim 1, wherein the meta information includes subscriber identity and/or equipment identity information.

8. The system recited in claim 1, wherein the meta information includes access point name (APN) and/or data network name (DNN) information.

9. The system recited in claim 1, wherein the meta information includes location information.

10. The system recited in claim 1, wherein the security platform is configured with a plurality of security policies to apply network slice based security, subscriber identity based security, equipment identity based security, access point name (APN) based security, data network name (DNN) based security, and/or location based security in the core mobile network.

11. The system recited in claim 1, wherein the processor is further configured to:
extract the meta information associated with the new session using the security platform executed on the network element in the core mobile network by performing inspection of packet forwarding control protocol (PFCP) messages, application programming interfaces (APIs), and/or syslog messages.

12. The system recited in claim 1, wherein the processor is further configured to:
selectively apply application control to the network traffic of subscribers in the core mobile network if the meta information associated with the network traffic matches the selective intelligent enforcement policy; and
offload the rest of the network traffic in the core mobile network if the meta information associated with the network traffic does not match the selective intelligent enforcement policy.

13. The system recited in claim 1, wherein the processor is further configured to:
selectively apply URL filtering to the network traffic of subscribers in the core mobile network if the meta information associated with the network traffic matches the selective intelligent enforcement policy; and
offload the rest of the network traffic in the core mobile network if the meta information associated with the network traffic does not match the selective intelligent enforcement policy.

14. The system recited in claim 1, wherein the processor is further configured to:
selectively apply known and/or unknown threat identification and/or prevention to the network traffic of subscribers in the core mobile network if the meta information associated with the network traffic matches the selective intelligent enforcement policy; and
offload the rest of the network traffic in the core mobile network if the meta information associated with the network traffic does not match the selective intelligent enforcement policy.

15. A method, comprising:
monitoring network traffic in a core mobile network using a security platform executed on a network element in the core mobile network to identify a new session that attached to the core mobile network for mobile network communications;
extracting meta information associated with the new session using the security platform executed on the network element in the core mobile network;
applying selective intelligent enforcement for mobile networks based on the extracted meta information using the security platform if the extracted meta information associated with the new session matches a selective intelligent enforcement policy, wherein the extracted meta information includes radio access technology (RAT) information, wherein the applying of the selective intelligent enforcement for mobile networks comprises:
checking that an IP address associated with the monitored network traffic matches a RAT type configured in a policy; and
in response to a determination that the IP address matches the RAT type policy, referring the RAT information to an IP data store of the security platform; and
offloading the new session to bypass security inspection by the security platform if the extracted meta information associated with the new session does not match the selective intelligent enforcement policy, wherein the network traffic associated with the new session that does not match the selective intelligent enforcement policy bypasses the security platform and layer 7 security is not applied to the network traffic associated with the new session to improve security analysis performance at the security platform.

16. The method of claim 15, wherein the security platform is executed on a host entity in the core mobile network.

17. The method of claim 15, wherein the security platform is a virtual firewall executed on a host entity in the core mobile network.

18. The method of claim 15, wherein the offloading of the new session to bypass the inspection by the security platform if the extracted meta information associated with the new session does not match the selective intelligent enforcement policy is performed by offloading the new session to a smart network interface card of the network element.

19. A computer program product, the computer program product being embodied in a non-transitory computer readable storage medium and comprising computer instructions for:
monitoring network traffic in a core mobile network using a security platform executed on a network element in the core mobile network to identify a new session that attached to the core mobile network for mobile network communications;
extracting meta information associated with the new session using the security platform executed on the network element in the core mobile network;
applying selective intelligent enforcement for mobile networks based on the extracted meta information using the security platform if the extracted meta information associated with the new session matches a selective intelligent enforcement policy, wherein the extracted meta information includes radio access technology (RAT) information, wherein the applying of the selective intelligent enforcement for mobile networks comprises:
  checking that an IP address associated with the monitored network traffic matches a RAT type configured in a policy; and
  in response to a determination that the IP address matches the RAT type policy, referring the RAT information to an IP data store of the security platform; and
offloading the new session to bypass security inspection by the security platform if the extracted meta information associated with the new session does not match the selective intelligent enforcement policy, wherein the network traffic associated with the new session that does not match the selective intelligent enforcement policy bypasses the security platform and layer 7 security is not applied to the network traffic associated with the new session to improve security analysis performance at the security platform.

* * * * *